United States Patent
Droznin et al.

(10) Patent No.: US 11,400,774 B2
(45) Date of Patent: Aug. 2, 2022

(54) RETRACTABLE TRACTION SYSTEM

(71) Applicants: Vadim Droznin, Ormond Beach, FL (US); Henry Droznin, North Port, FL (US)

(72) Inventors: Vadim Droznin, Ormond Beach, FL (US); Henry Droznin, North Port, FL (US)

(*) Notice: Subject to any disclaimer, the term of this patent is extended or adjusted under 35 U.S.C. 154(b) by 0 days.

(21) Appl. No.: 17/506,958

(22) Filed: Oct. 21, 2021

(65) Prior Publication Data

US 2022/0041022 A1 Feb. 10, 2022

Related U.S. Application Data

(63) Continuation of application No. 16/248,151, filed on Jan. 15, 2019, now Pat. No. 11,155,131.

(60) Provisional application No. 62/617,350, filed on Jan. 15, 2018.

(51) Int. Cl.
*B60C 27/04* (2006.01)
*B60C 27/02* (2006.01)

(52) U.S. Cl.
CPC .......... *B60C 27/045* (2013.01); *B60C 27/023* (2013.01)

(58) Field of Classification Search
CPC .................... B60C 27/045; B60C 27/023
See application file for complete search history.

(56) References Cited

U.S. PATENT DOCUMENTS

| 2,427,510 | A | | 9/1947 | Richardson et al. |
| 2,474,939 | A | * | 7/1949 | Halford ................. B60C 27/045 301/47 |
| 2,581,770 | A | | 1/1952 | Pittinger |
| 3,311,150 | A | * | 3/1967 | Wykoff ................. B60C 27/145 152/214 |
| 3,482,617 | A | | 12/1969 | Putt et al. |
| 4,024,900 | A | | 5/1977 | Thomas |

* cited by examiner

*Primary Examiner* — Scott A Browne
(74) *Attorney, Agent, or Firm* — Sunstein LLP

(57) ABSTRACT

A system is provided for retractably deploying traction of a wheel. The system includes a set of grippers, each gripper having a cleat and a radially disposed strut. The system further includes a set of first poles, each first pole coupled to one of the struts, the first pole configured to support motion of its corresponding strut between a parked position and an engaged position, wherein, in the engaged position, the corresponding cleat is axially disposed and engaged against the tread of the wheel and, in the parked position, the corresponding cleat is disengaged from the tread of the wheel. The system includes a first faceplate configured to rotate with the wheel. The system further includes a cleat deployment mechanism having a second faceplate rotatably coupled to the first faceplate, and a set of second poles, each second pole coupled to one of the struts and to the second faceplate.

5 Claims, 29 Drawing Sheets

RETRACTABLE TRACTION SYSTEM

CROSS-REFERENCE TO RELATED APPLICATIONS

This patent application is a continuation of U.S. application Ser. No. 16/248,151, filed Jan. 15, 2019, now U.S. Pat. No. 11,155,131, which claims priority from U.S. Provisional Application No. 62/617,350, filed Jan. 15, 2018, the disclosure of each of which is incorporated by reference herein in its entirety.

TECHNICAL FIELD

The present invention relates to traction systems, and more particularly to retractable traction systems for vehicles and machines having one or more wheels.

BACKGROUND ART

One major challenge facing standard wheels of vehicles is the loss of traction in icy or snowy environments. This is particularly true in cold climates, where vehicles having tires with increased traction are sought out for safety. Among the conventional solutions are snow tires and tire chains, which require the user of the vehicle or other machinery to install and uninstall the snow tires or tire chains. For example, the user has to plan ahead of a snowstorm or snow season to install the snow tires or tire chains. Further, those without the necessary tools or skills to install these conventional solutions are disadvantaged because they must either do without enhanced traction (and risk their safety on the road) or pay for the installation. In another example, robots that are deployed to snowy climates, or even other planets, do not typically have humans to install these conventional solutions to increase the traction of the robot's tires.

SUMMARY OF THE EMBODIMENTS

In accordance with one embodiment of the invention, a system is provided for retractably deploying enhanced traction of a wheel having a tread and an axis of rotation. The system includes a set of grippers, each gripper having a cleat and a radially disposed strut. The system further includes a set of strut mounts, each strut mount coupled to one of the struts, the strut mount configured to support motion of its corresponding strut between a parked position and an engaged position, wherein, in the engaged position of such strut, the corresponding cleat is axially disposed and engaged against the tread of the wheel and, in the parked position of such strut, the corresponding cleat is disengaged from the tread of the wheel, and a faceplate configured to rotate with the wheel, wherein when such strut is in the engaged position, such strut is coupled to the faceplate and moves with the faceplate and the wheel, and when such strut is in the parked position the strut causes the cleat to be withdrawn in a radial direction from the tread. The system further includes a cleat deployment mechanism, coupled to the struts, configured on actuation to cause automatic deployment of the struts into the engaged position.

In a related embodiment, the cleat deployment mechanism includes a circular raceway defining a center that coincides with the axis of rotation and a set of sliders mounted for rotational motion in the raceway. The system further includes a second set of sliders mounted for rotational motion in a second raceway concentric with the raceway, and a second set of strut mounts, each second strut mount coupled to one of the second sliders and to one of the struts. Optionally, each strut is coupled to one of the sliders and to one of the second sliders.

In another related embodiment, the system further includes a set of pushers protruding from the faceplate, wherein as the faceplate rotates with the wheel, each of the set of pushers is configured to couple with a corresponding strut. Optionally, the system includes a set of pegs, each peg moveably coupled to a corresponding one of the set of strut mounts, each peg having a parked and engaged position, wherein each peg is configured to move from its parked position to its engaged position so that each peg comes into contact with a corresponding one of the set of pushers.

In yet another related embodiment, the system further includes a set of springs, each spring mounted to an arm of one of the set of strut mounts, each spring configured to decompress to cause a corresponding one of the set of pegs to move to its engaged position. Optionally, the system includes a stopper configured to block a path of a first one of the set of sliders in the raceway during the parked position of the strut, wherein the stopper is further configured to compress the spring of the corresponding arm of a first one of the strut mounts and push the peg of the corresponding first one of the strut mounts into its parked position. Optionally, the stopper is configured to move from the path before the strut is in the engaged position.

In yet another related embodiment, the system further includes a controller coupled to the stopper, the controller configured to cause movement of the stopper. Optionally, the controller is configured to receive an activation signal from a vehicle computer system or remote device, the activation signal causing the controller to move the stopper out of the path. Optionally or alternatively, the controller is configured to receive a deactivation signal from a vehicle computer system or remote device, the deactivation signal causing the controller to move the stopper into the path. Optionally, the remote device is a remote starter for a vehicle or a network-enabled device. Optionally, the network-enabled device is a smartphone, tablet, or computer. In a related embodiment, the system further includes a cable coupled directly or indirectly to the stopper, wherein the cable is configured to cause movement of the stopper.

In another related embodiment, the system further includes a second stopper configured to block reverse movement of a last one of the set of sliders in the raceway. In yet another related embodiment, the system further includes a set of cups having at least one cup wall, the cup movably coupled to a pivot mount of a corresponding one of the strut mounts, the cup having a parked and engaged position, wherein each cup is configured to be adjusted from its parked position to its engaged position so that the at least one cup wall comes into contact with a corresponding one of the set of pushers. Optionally, the pivot mount configured to be adjusted by at least one electromechanical solenoid having a plunger configured to engage with a subject end of the pivot mount to cause a corresponding one of the set of cups to move to its engaged position. Optionally, pivot mount configured to be adjusted by at least one torsion spring configured to engage with a subject end of the pivot mount to cause a corresponding one of the set of cups to move to its engaged position. Optionally, the cleat is rotatably mounted to the strut.

In a related embodiment, the cleat deployment mechanism includes a second faceplate rotatably connected to the faceplate, such that the struts are in the parked position when the second faceplate is in a first position relative to the faceplate and the struts are in the engaged position when the second faceplate is in a second position relative to the faceplate, the first position being different than the second position. The cleat deployment mechanism may further include a spring that moves the second faceplate from the first position to the second position. The cleat deployment mechanism may further include a mechatronics cylinder that moves the second faceplate from the second position to the first position.

In accordance with another embodiment of the invention, a vehicle wheel includes a traction system according to any of the embodiments described herein, wherein a faceplate of the traction system is configured to be coupled to a side of the wheel, the side of the wheel facing toward a vehicle chassis. Optionally, the faceplate is mounted to the side of a rim of the wheel. Optionally, the faceplate is a part of a rim of the wheel.

In accordance with another embodiment of the invention, a vehicle wheel includes a traction system according to any one of the embodiments described herein, wherein a faceplate of the traction system is configured to be mounted to a side of a rim of the wheel, the side of the rim facing toward a vehicle chassis.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "wheel" is an assembly that is removably attachable to an axle of a vehicle or machine and includes a traction element, such as a tire, having a tread that is in contact with the ground when the vehicle or machine is in use. (Note that this definition is broader than some technical usages of the term "wheel," which may exclude the tire.)

Retractable Traction System

Figure 1A:
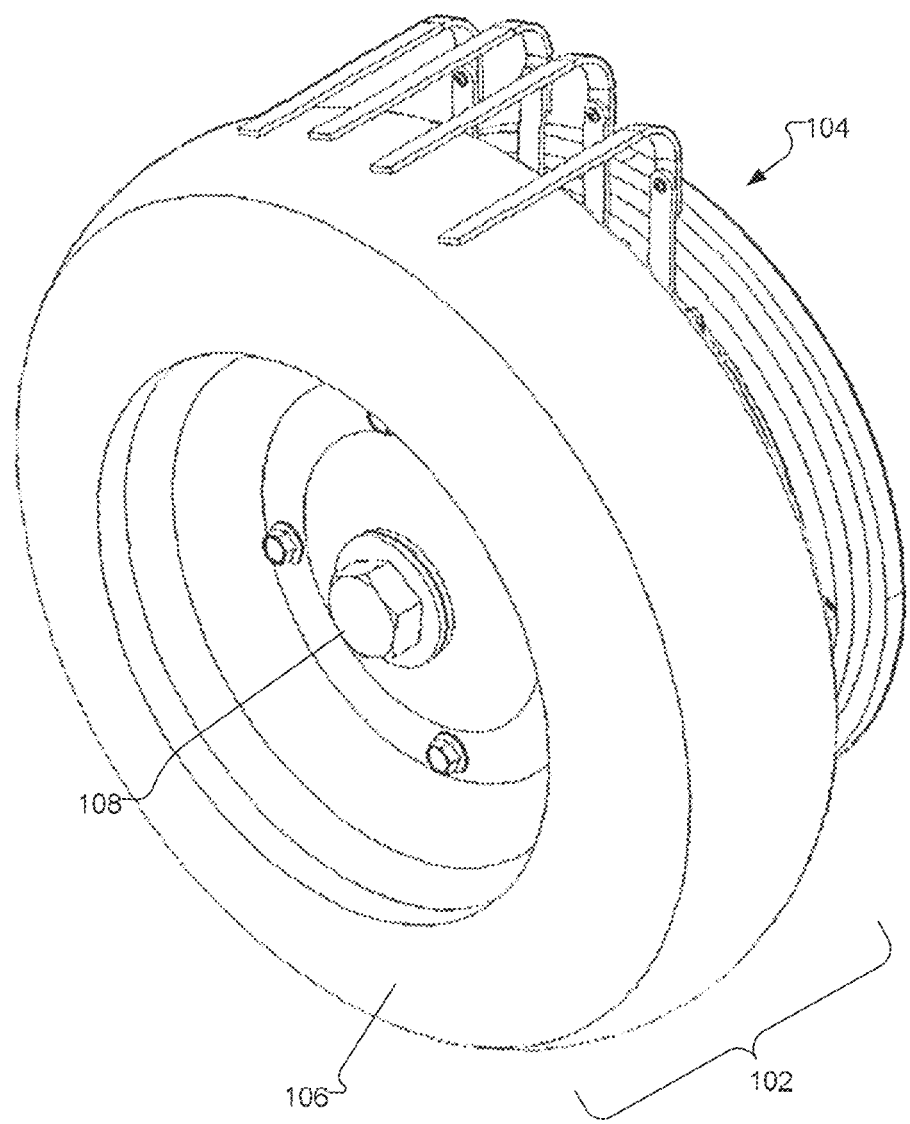
FIGS. 1A-1B are perspective views of an exemplary embodiment of a retractable traction system configured to operate with a wheel, in accordance with an embodiment of the invention.
Figure 1B:
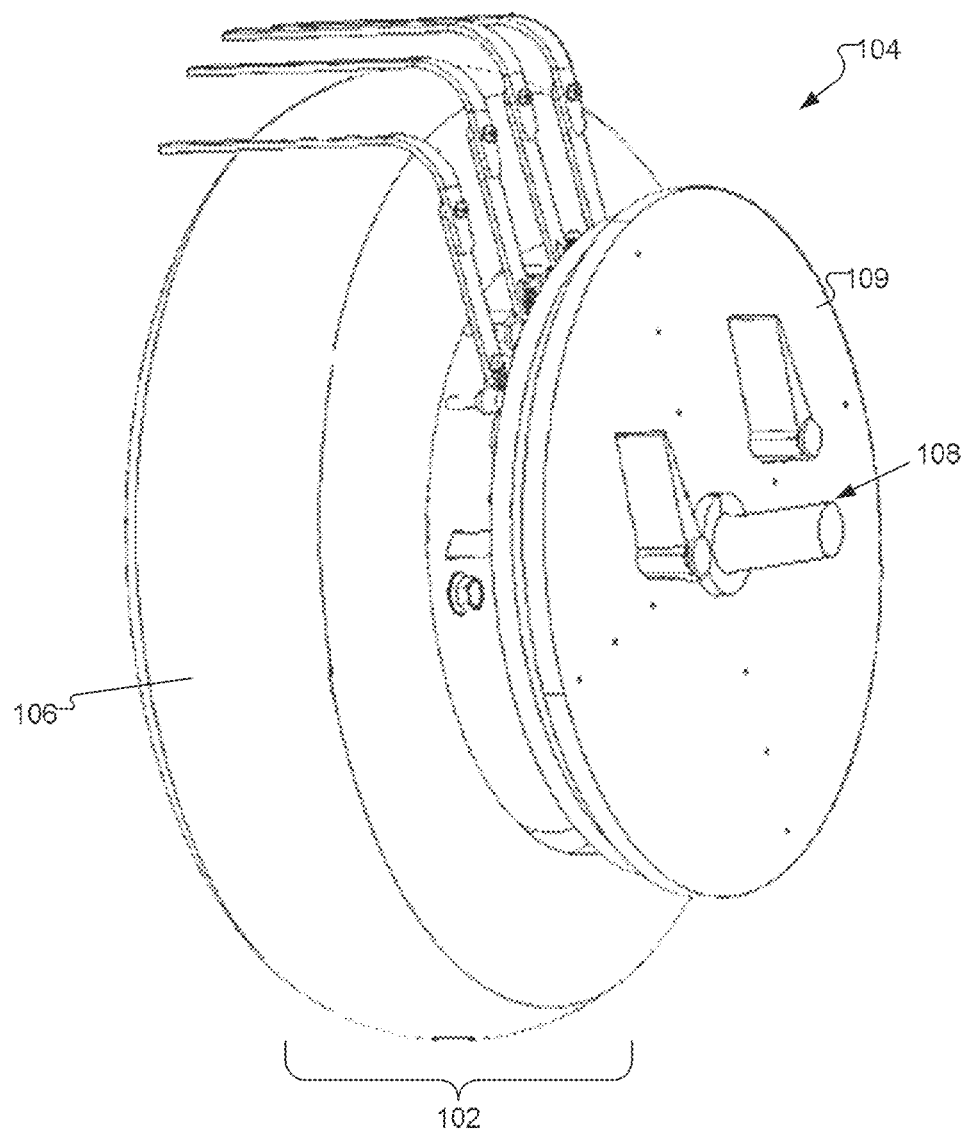

FIGS. 1A-1B are perspective views of an exemplary embodiment of a retractable traction system 104 configured to operate with a wheel 102. The wheel 102 can be a conventional wheel of, for example, an automobile. In some embodiments, the retractable traction system 104 can be configured to operate with other wheel types, such as non-standard wheels or wheels for robots, machinery, military equipment, space equipment, etc. In FIGS. 1A-1B, a conventional wheel 102 is illustrated and includes tire 106. The retractable traction system 104 can be described in two major portions, a first subassembly 200 (described in further detail in FIG. 2) that is positioned about an axle 108 on which the wheel 102 is mounted and a second subassembly 300 (described in further detail in FIG. 3) that is mounted to a face of the wheel 102 and is configured to engage with the first subassembly 200.

Figure 2A:
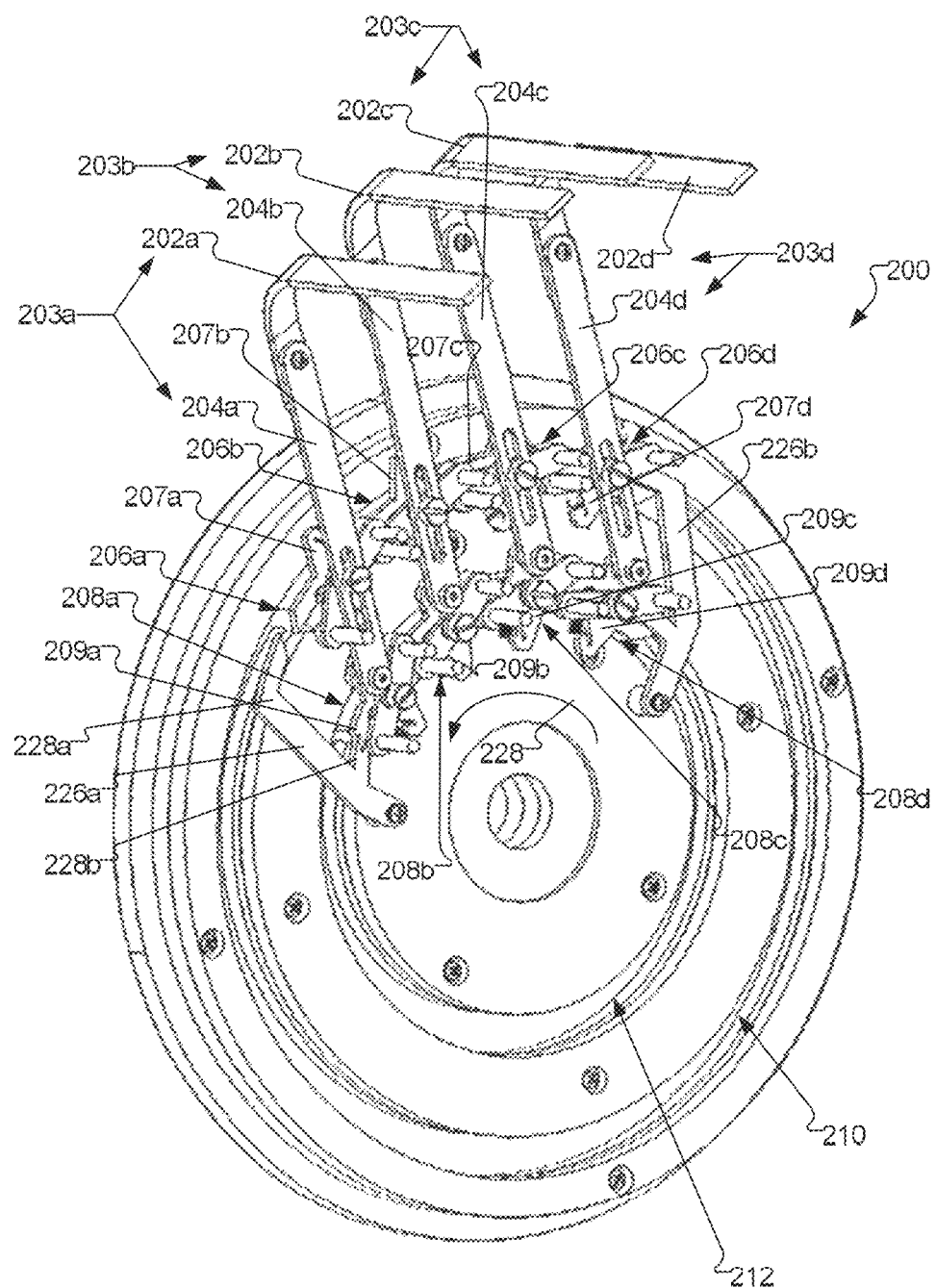
FIG. 2A is a perspective view of a first subassembly of an exemplary retractable traction system, in accordance with another embodiment of the invention.
Figure 12A:
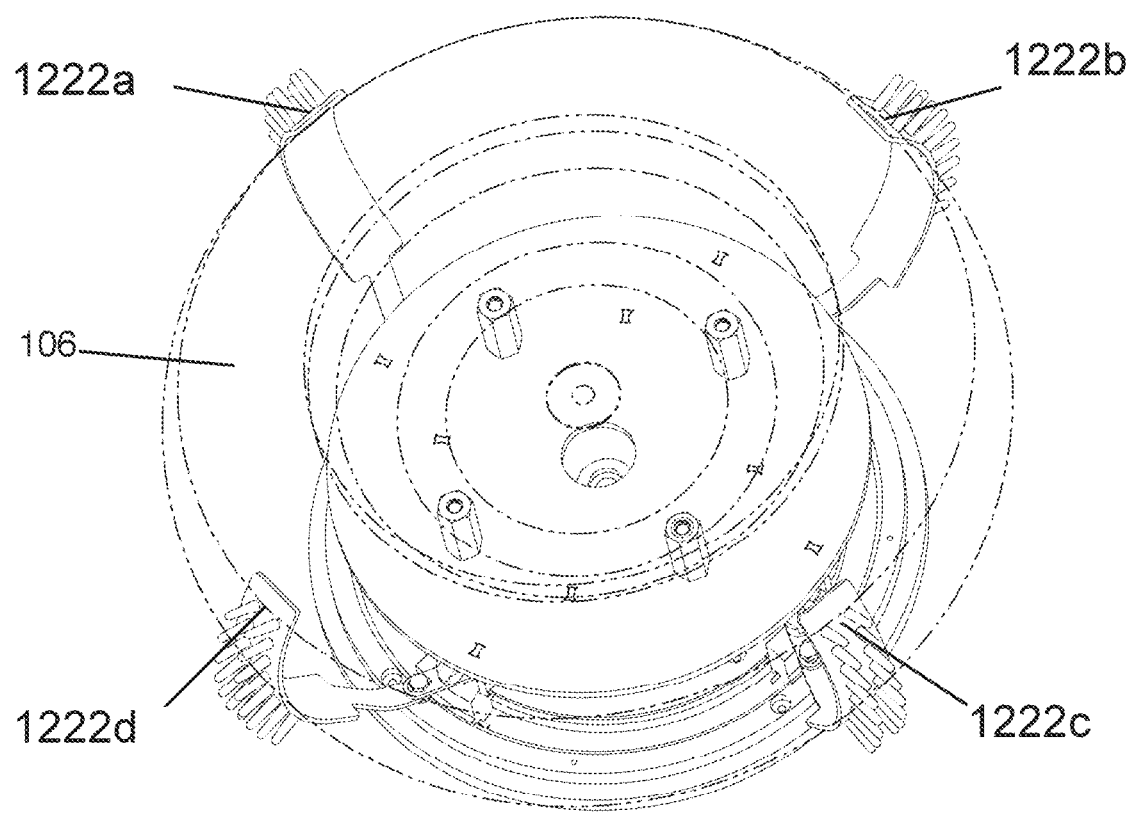
FIGS. 12A and 12B are a perspective view and side view, respectively, of an embodiment of a retractable traction system mounted on a wheel.
Figure 12B:
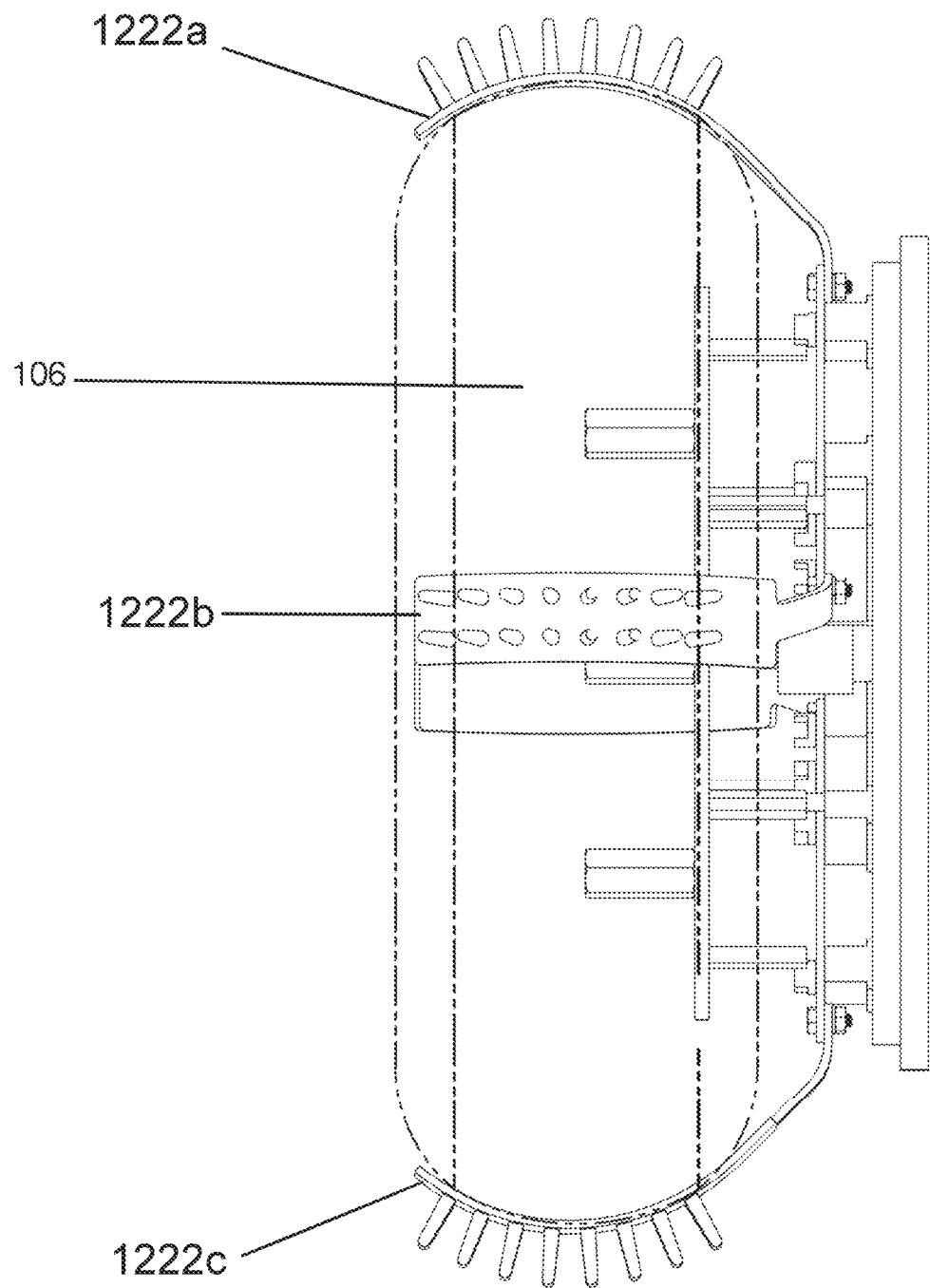
Figure 12C:
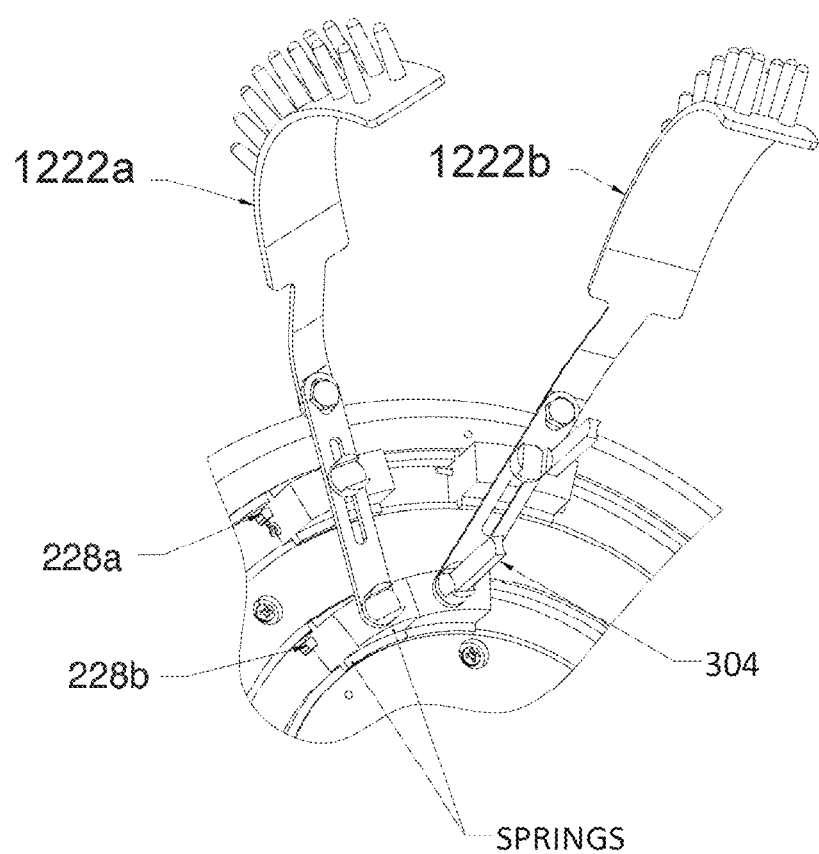
FIG. 12C is a perspective view of a subset of components of the retractable traction system shown in FIGS. 12A-12B, in accordance with another embodiment of the invention.
Figure 13A:
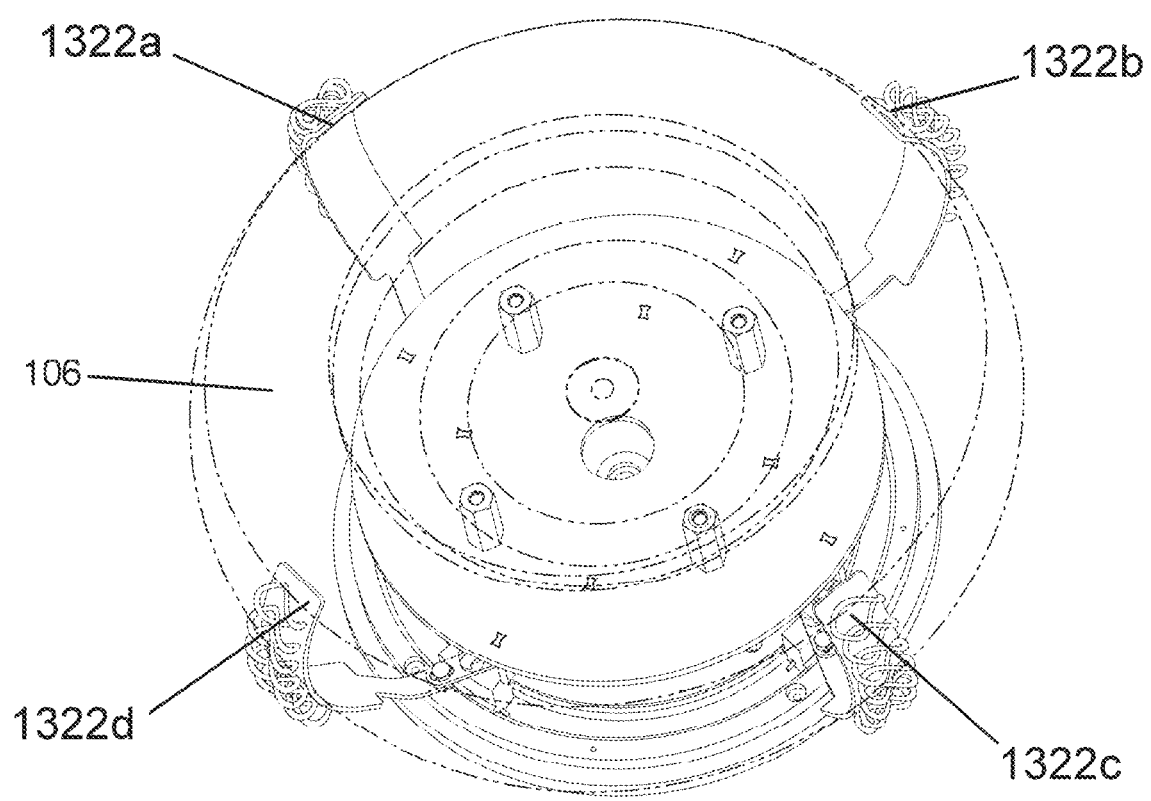
FIGS. 13A and 13B are a perspective view and side view, respectively, of another embodiment of a retractable traction system mounted on a wheel in accordance with another embodiment of the invention.
Figure 13B:
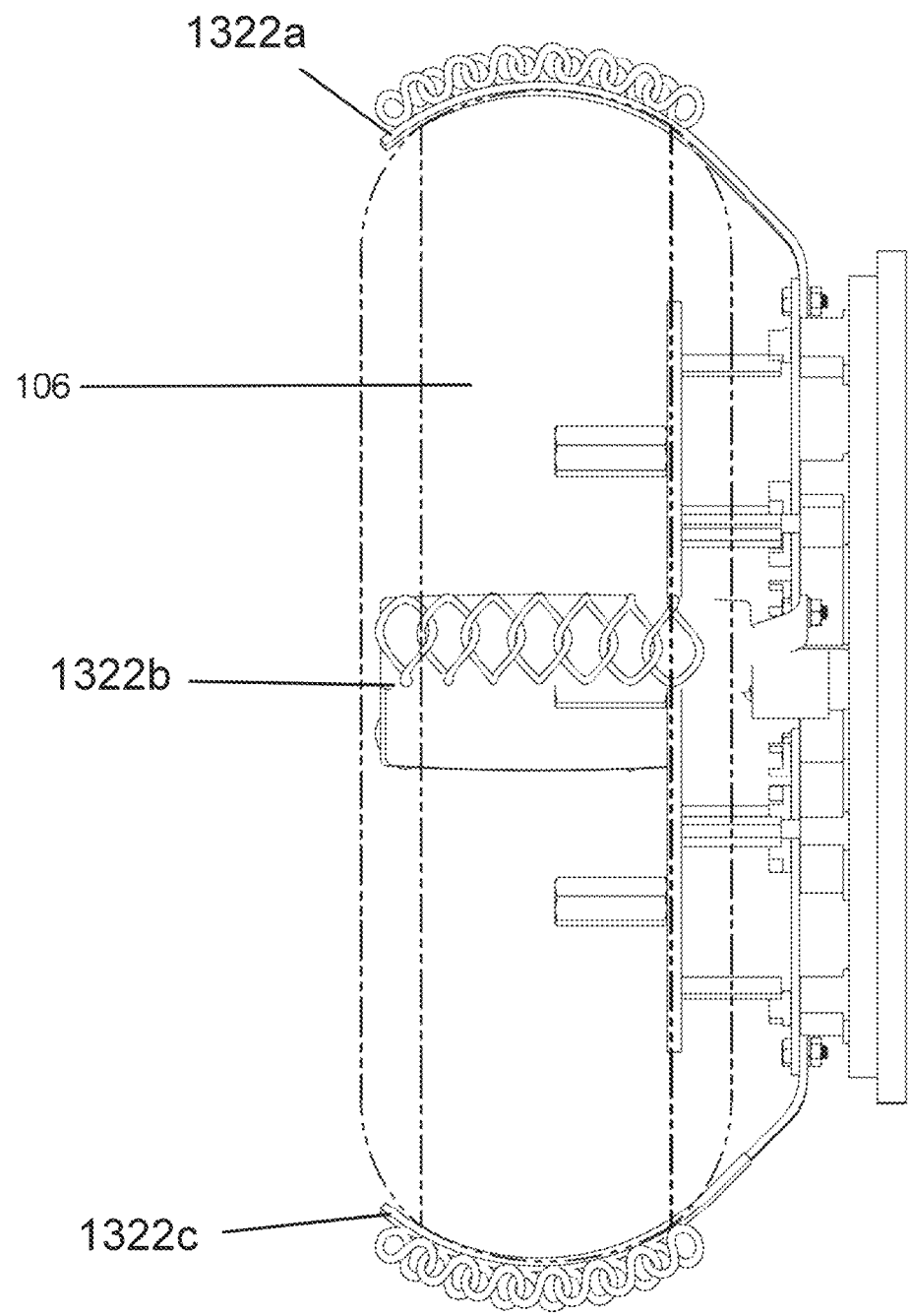

FIG. 2A is a perspective view of the first subassembly 200 of an exemplary retractable traction system 104. The first subassembly 200 includes a set of grippers 203*a*-203*d* (collectively referred to as 203) that include a cleat 202*a*-202*d* (collectively referred to as 202) removably mounted to a corresponding strut 204*a*-204*d* (collectively referred to as 204) to provide increased traction for the wheel. In this embodiment, each of cleats 202 is coupled to a corresponding one of struts 204. Though there are four grippers 203 shown in the first subassembly 200, there can be as few as three grippers to provide effective enhanced traction. In some embodiments, the number of grippers can be determined by the size and configuration of the wheel. For example, a large sized wheel may require eight grippers. For military tanks that utilize a band coupled to multiple wheels, there may be a higher number of grippers to accommodate the size and shape of the surface that requires enhanced traction. The grippers may be any shape and have any surface configuration suited to increase traction for a wheel. For example, FIGS. 12A-12C show a surface configuration having spikes (1222*a*, 1222*b*, 1222*c*, 1222*d*) and FIGS. 13A-13B show a surface configuration having chain links (1322*a*, 1322*b*, 1322*c*, 1322*d*).

In some embodiments, each strut 204 is coupled to a slider that is configured to guide the strut 204 around the wheel during the deployment of the retractable traction system 104. The exemplary cleats 202*a*-202*d* are mounted to struts 204*a*-204*d*, respectively, which are each coupled to at least one slider 206*a*-206*d* (collectively referred to as 206), 208*a*-208*d* (collectively referred to as 208). The first subassembly 200 shown in FIGS. 2A-2B include both a set of outer sliders 206 and inner sliders 208. In some embodiments, the struts 204 may be coupled only to inner sliders 208.

Figure 2B:
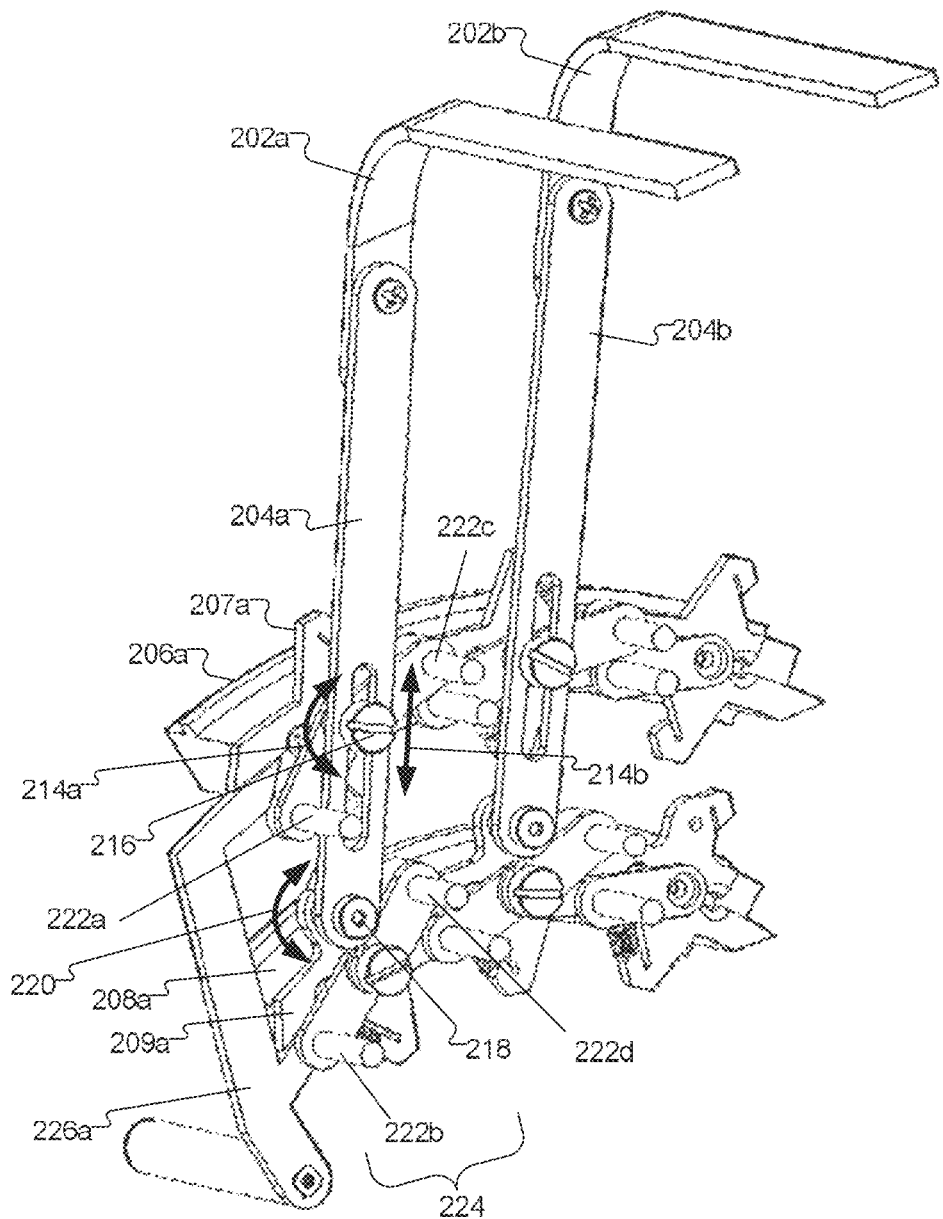
FIG. 2B is a perspective view of a subset of components of the retractable traction system shown in FIG. 2A, in accordance with another embodiment of the invention.

The first subassembly 200 includes an inner set of sliders {inner slider 1, inner slider 2, . . . inner slider M}, where M is a whole number, and an outer set of sliders {inner slider 1, inner slider 2, . . . inner slider N}, where N is a whole number. In the preferred embodiment described herein, M=N, but in other embodiments, M can be different than N. In this case, where M=N, an inner slider 208*a*-208*d* and an outer slider 206*a*-206*d* are paired with one another. Thus, as shown in FIGS. 2A-2B, inner slider 208*a* is paired with outer slider 206*a*, inner slider 208*b* is paired with outer slider 206*b*, and so on. Each slider 206*a*-206*d*, 208*a*-208*d* is coupled to a respective strut mount 207*a*-207*d* (collectively referred to as 207), 209*a*-209*d* (collectively referred to as 209) that is configured to anchor the strut 204 such that the strut 204 can move relative to the respective slider 206, 208.

FIG. 2B is a perspective view of a subset of components of the first subassembly 200 shown in FIG. 2A. As more clearly shown in FIG. 2B, each exemplary strut 204 is coupled to one inner slider 208*a*-208*d* and one outer slider 206*a*-206*d*. For example, strut 204*a* is coupled to an outer slider 206*a* via strut mount 207*a* such that the strut 204*a* is able to move relative to the slider 206*a* with two degrees of freedom 214*a* and 214*b*. Specifically, strut 204*a* can rotate about pivot pin 216 (of the strut mount 207*a*) with rotation 214*a* and slide relative to pivot pin 216 with translation 214*b*. In this embodiment, the strut 204*a* is also coupled to an inner slider 208*a* via pivot pin 218; the strut 204*a* can rotate around pivot pin 218 with rotation 220. The sum effect of these mechanisms is that each gripper can be individually guided around the wheel 102 by interaction with the outer and inner sliders 206 and 208, respectively. Note on each strut mount 207 (of both inner and outer sliders 208, 206) are two sets of pegs 222 (shown as 222*a*-222*d*), a forward peg (for example, peg 222*a* or 222*b*) and reverse peg (for example, peg 222*c* or 222*d*), that are used to catch the pushers of the second subassembly 300 (described further below for FIG. 3).

Returning to FIG. 2A, the first subassembly 200 includes an outer raceway 210 and an inner raceway 212 that each holds a set of sliders 206, 208. The outer raceway 210 holds the set of outer sliders 206*a*-206*d* and the inner raceway 212 holds the set of inner sliders 208*a*-208*d*. In some embodiments, the sliders 206, 208 may be shaped to have a flange so as to slidably fit into the slots formed into walls of the raceways. The radius of the curvature of the slider shape corresponds to the radius of the respective raceway 210, 212.

In this embodiment, the first subassembly 200 has four gripper-assemblies 224 (shown as 224*a*-224*d* in FIGS. 4A-4E below), each of which include gripper 203 (composed of a cleat 202 and a strut 204), an outer slider 206, an outer strut mount 207, an inner slider 208, and an inner strut mount 209. These gripper-assemblies 224 are configured to be held in place by at least a first stopper 226*a*. Note that this first stopper 226*a* is positioned to stop the gripper-assemblies 224 from moving in the direction 228 of deployment when the first subassembly 200 is in the "parked" position. In some embodiments, the first stopper 226*a* has an outer protrusion 228*a* configured to stop or hold in place at least outer slider 206*a* and an inner protrusion 228*b* configured to stop or hold in place at least inner slider 208*a*. In this embodiment, the gripper-assemblies 224 are held on each end by the first stopper 226*a* and the second stopper 226*b* (collectively referred to as stopper(s) 226). In some embodiments, instead of a mechanical stopper 226 as provided here, magnetic material can be used to keep the sliders 206, 208 in place in its raceway 210, 212 until activated. Some embodiments of the tractions system may make use of both mechanical stoppers and magnetic material to keep sliders 206, 208 in place. Note that the exemplary strut mounts 207, 209 are shaped to interact with the one or more stoppers 226 and each other. For example, the arms of the strut mounts 207*a*, 209*a* extend to push the peg 222 of its neighbor strut mount 207*b*, 209*b* to engage a pusher of the faceplate of the second subassembly 300. One or more stoppers 226 may be any shape allowing them to stop a slider (206 and/or 208) of the retractable traction system 104. For example, one or more of the stoppers 226 may be flat such that there are no protrusions.

Figure 3:
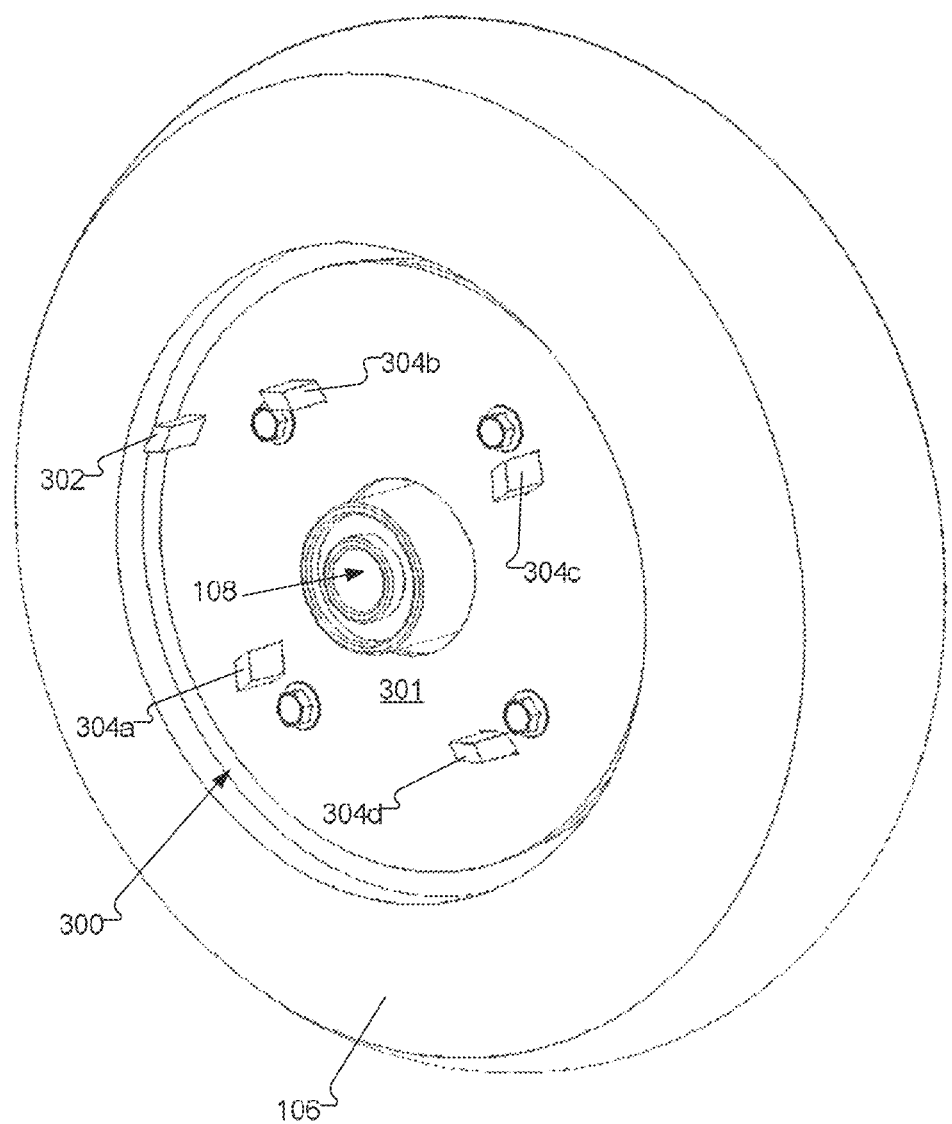
FIG. 3 is a perspective view of a conventional wheel coupled to a second subassembly of the retractable traction system, in accordance with another embodiment of the invention.

FIG. 3 is a perspective view of a conventional tire 106 of wheel 102 coupled to the second subassembly 300 of the retractable traction system 104. The second subassembly 300 includes a faceplate 301 in which a set of outer pushers 302 and a set of inner pushers 304 (shown as 304*a*-304*d*) are mounted. In this embodiment, there is one outer pusher 302 and four inner pushers 304*a*-304*d* (collectively referred to as 304). The outer pusher(s) 302 are located at radial positions corresponding to the positions of the pegs 222 of the outer sliders 206 in the first subassembly 200. The outer pusher 302 is configured to right the struts during retraction of the retractable traction system 104 to avoid contact between the cleats and the tire surface, as described in more detail below. The inner pusher(s) 304 are located at radial positions corresponding to the positions of the pegs 222 of the inner sliders 208 of the first subassembly 200. Thus, for example, the inner pusher 304 is configured to come in contact with peg 222*b* and push it in an axial motion so that the gripper-assembly 224 moves around the tire 106 of wheel 102, as described more fully below.

In an exemplary embodiment, the faceplate 301 of the second subassembly 300 can be coupled to the side of the wheel such that it is mounted to the rim of the wheel (for instance, the inner rim facing the chassis of the vehicle). In another exemplary embodiment, the faceplate can be part of the rim of the wheel. In other words, the faceplate 301 can be manufactured as part of the rim of the wheel.

Note that, while specific shapes are provided here for each of the components of the exemplary embodiments of the retractable traction system 104, a person skilled in the art would understand that other shapes, formed by various means, can achieve similar functionality and results. For example, wheel 102 of the retractable traction system 104 may be printed on three-dimensional ("3D") printers without rims in a manner such that faceplate 301 is a part of wheel 102 itself.

Traction System Deployment

Figure 4A:
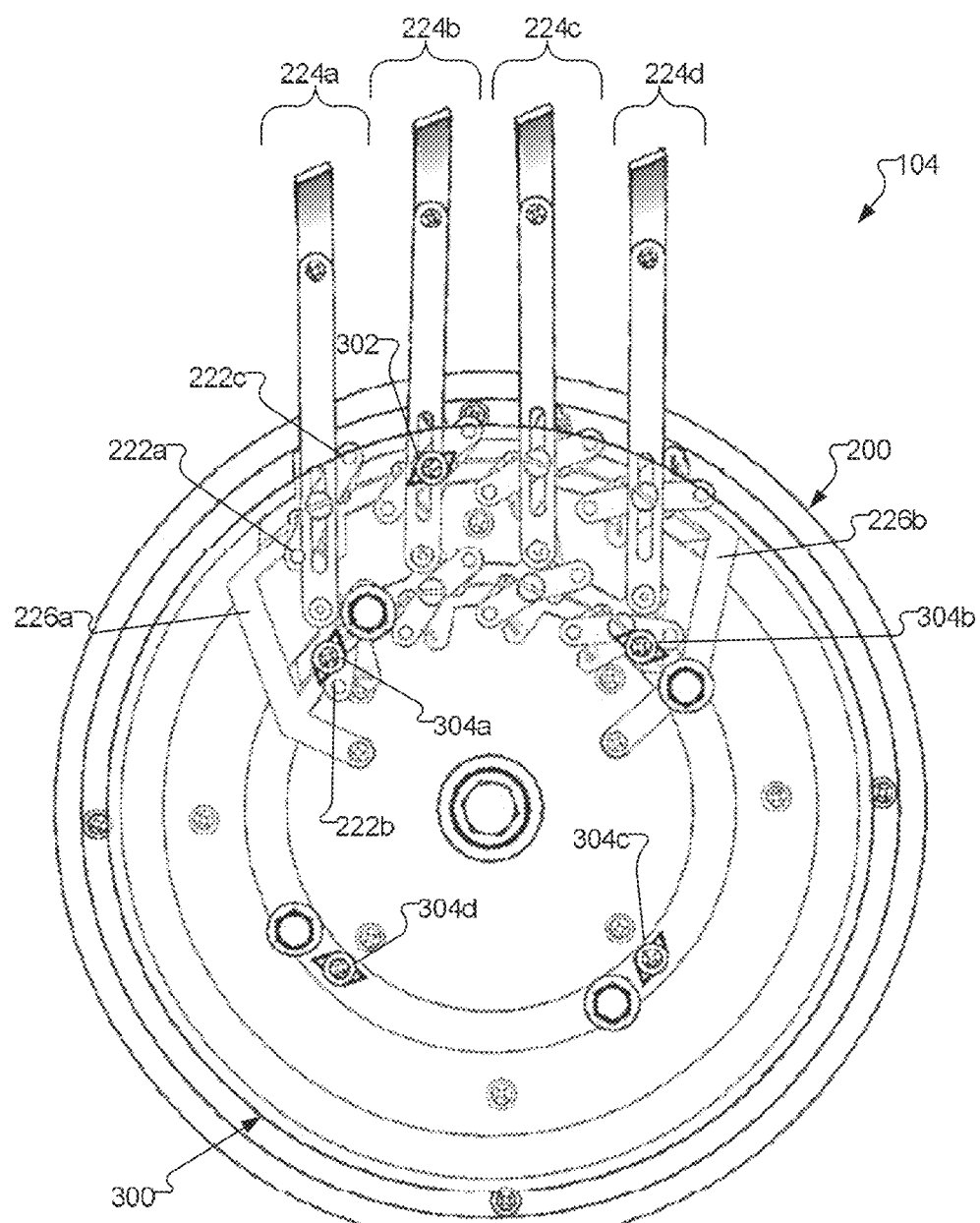
FIGS. 4A-4E are front views of an exemplary retractable traction system, wherein each figure illustrates a portion of the process of deploying and/or retracting the retractable traction system, in accordance with another embodiment of the invention.
Figure 4B:
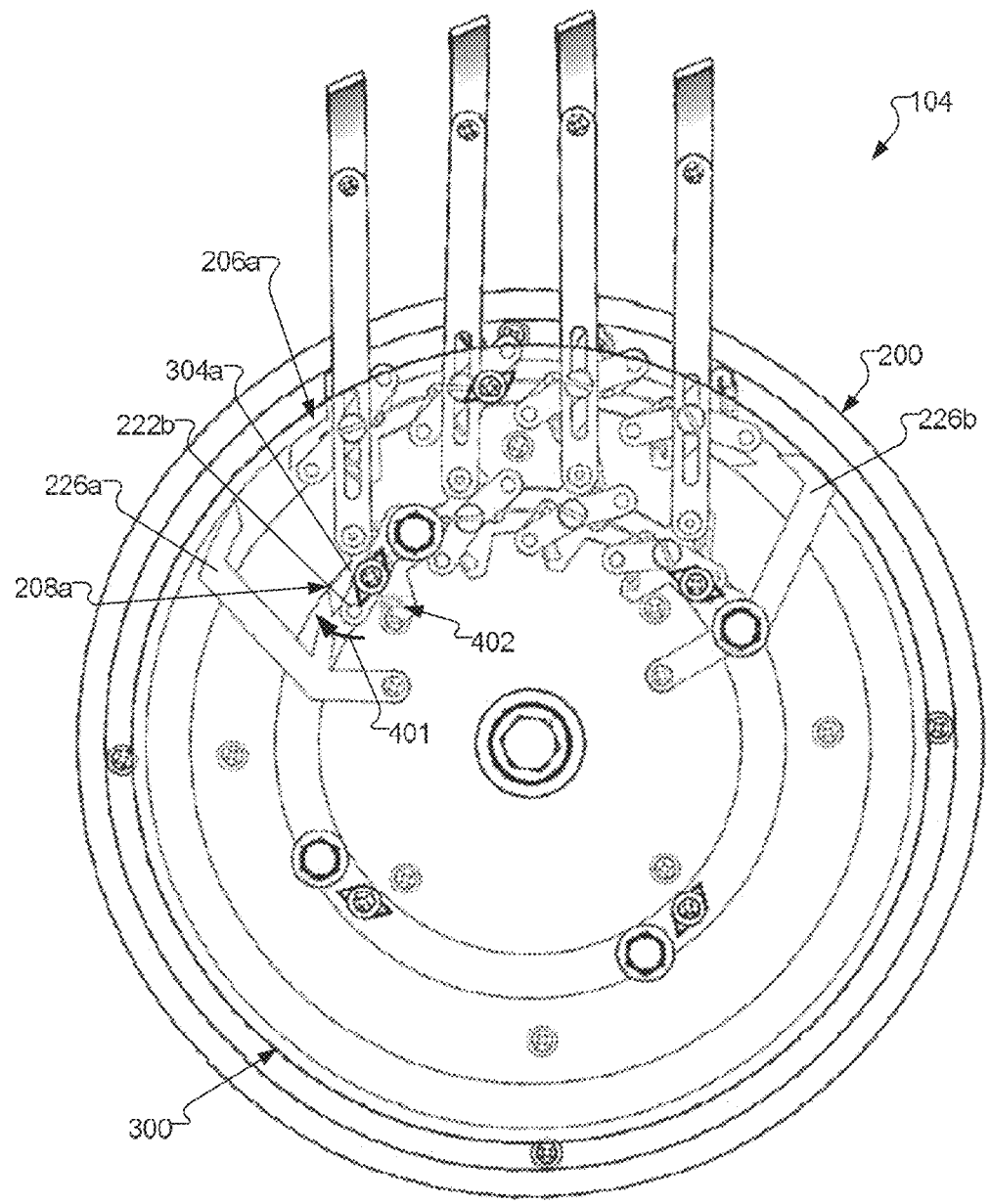
Figure 4C:
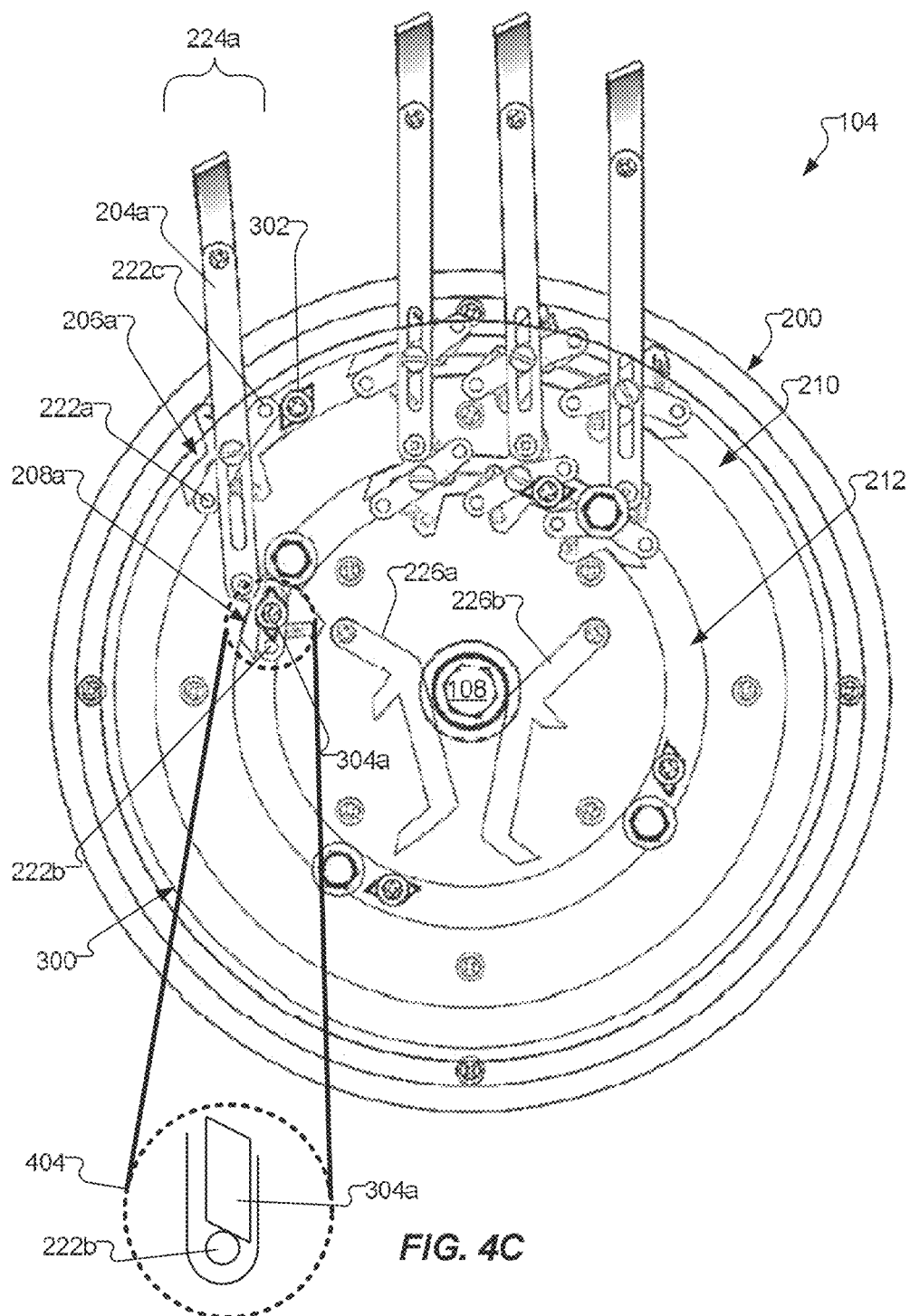
Figure 4D:
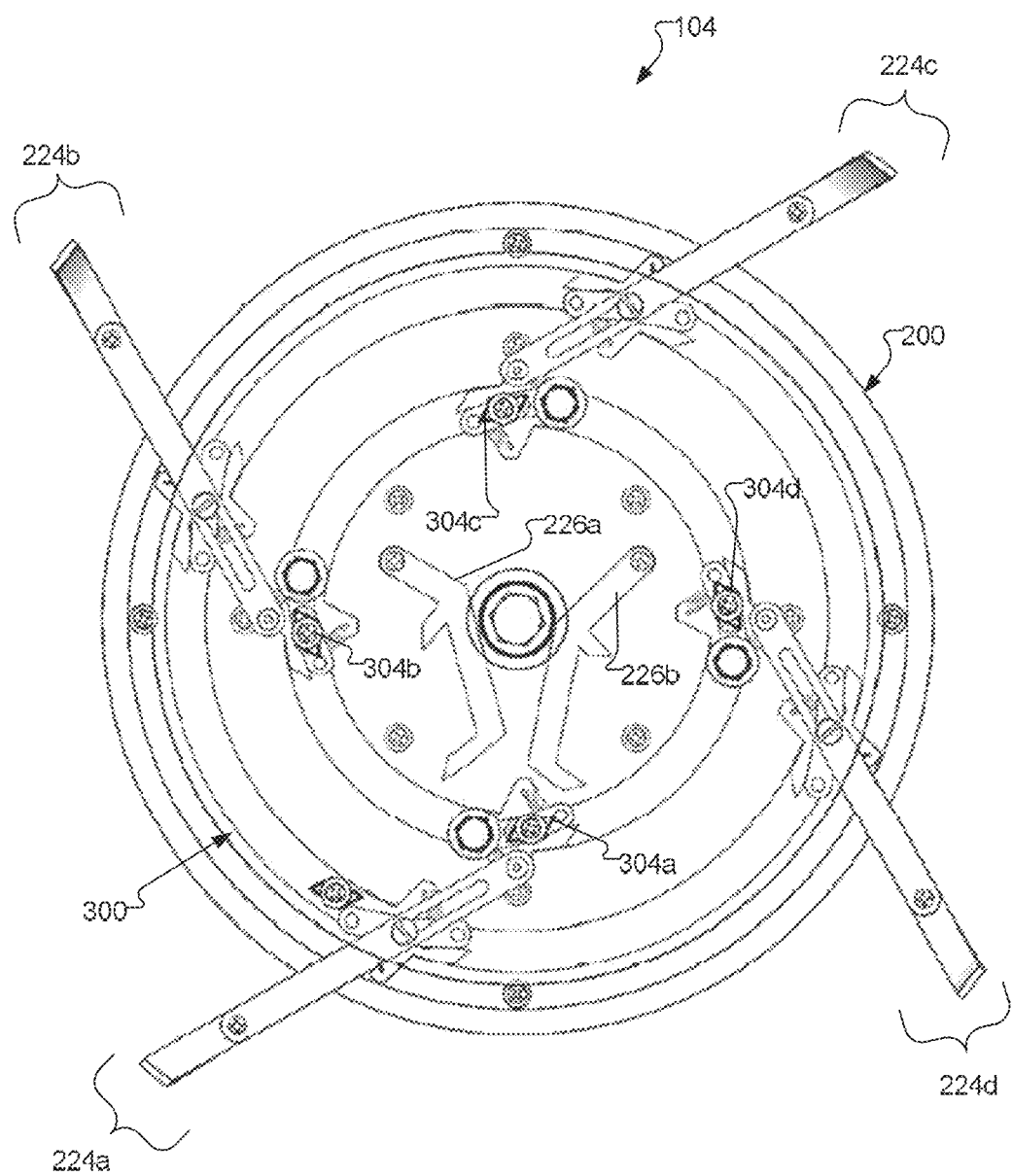
Figure 4E:
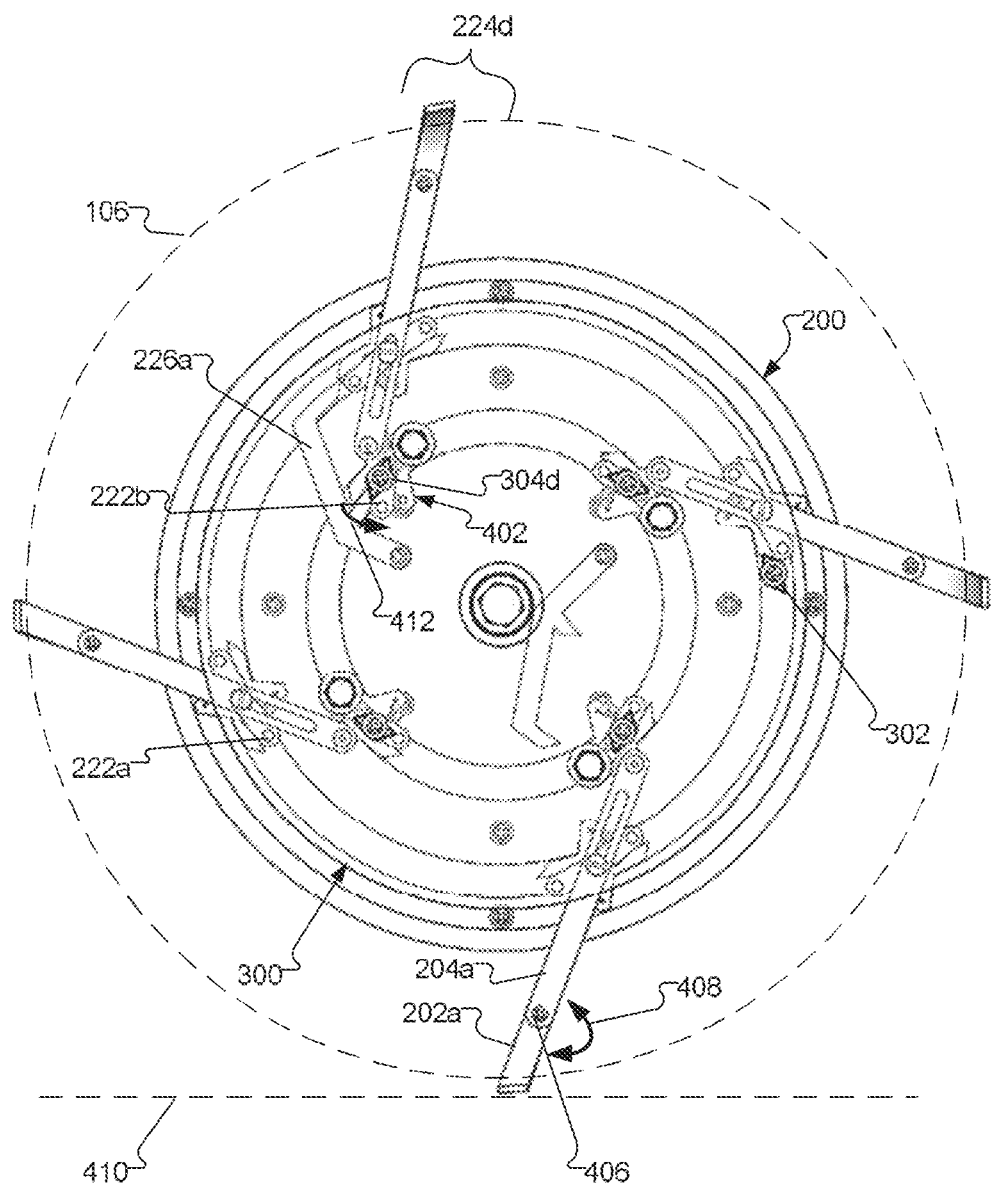

FIGS. 4A-4E are front views of an exemplary retractable traction system 104, wherein each figure illustrates a portion of the process of deploying and/or retracting the retractable traction system 104. In each of FIGS. 4A-4E, the second subassembly 300 is shown as a transparent component so that the components of the first subassembly 200 are visible. In FIG. 4E, the tire 106 is shown as a transparent component for context and is not shown in FIGS. 4A-4D in order to simplify the figures. An example of the faceplate 301 is more clearly illustrated in FIG. 3. Note that any one or more of the processes described herein can be actuated mechanically or electronically, whether automatically or by a user of the retractable traction system 104. Discussion of the control of the retractable traction system 104 follows below.

FIG. 4A illustrates a "parked" position of the retractable traction system 104, in which the set of gripper-assemblies 224a-224d (of first subassembly 200) are grouped near the top of the wheel (not shown). In some embodiments, the gripper-assemblies 224a-224d can be held together or in subsets along any side of the wheel, so long as the holding mechanism does not interfere with the normal operation of a vehicle's wheel while the retractable traction system 104 is retracted (for example, not in use during normal road conditions). Note that, in this "parked" or retracted mode, second subassembly 300 having pushers 302, 304 continues to revolve about the axle as the wheel 102 turns (for example, while driving in normal conditions). Specifically, none of the pushers 302, 304 catch the pegs 222 and instead go right past them as the wheel 102 turns.

FIG. 4B illustrates the retractable traction system 104 during deployment in which the stoppers 226a, 226b are moved out of the way of the inner and outer sliders 208, 206. The stopper 226a moving away from inner slider 208a and outer slider 206a causes the peg 222b of the inner slider 208a to move (with motion 401) from its parked position so that an inner pusher 304 of subassembly 300 will make contact. This mechanism is facilitated by springs 402 that push the peg 222 (e.g., peg 222b) into position to be caught by the inner pusher 304 (e.g., inner pusher 304a). In some embodiments, the stoppers 226a, 226b are controlled mechanically or electronically by a user or automatically upon the initialization of the retractable traction system 104. For example, the position of the stopper(s) 226 may be controlled by a cable accessible by a user, and the user may pull a cable in the vehicle to cause the stopper(s) 226 to move from the path of the one or more sliders 208, 206.

FIG. 4C illustrates the retractable traction system 104 during deployment in which stoppers 226a, 226b are entirely out of the way of the inner and outer sliders 208, 206. Upon deployment of the retractable traction system 104, inner pusher 304a of second subassembly 300 makes contact with peg 222b (also shown in the zoomed-in view 404). This contact pushes inner slider 208a along the inner raceway 212 (counterclockwise, in this example). This causes the bottom of strut 204 to move with the inner slider 208a. Eventually, the gripper-assembly 224a is caused to move around the axis of rotation (in this case, the axle 108 of the wheel).

FIG. 4D illustrates the retractable traction system 104 during deployment in which the gripper-assemblies 224a-224d are pushed by the respective inner pushers 304a-304d, as detailed above for gripper-assembly 224a. The inner pushers 304 are distributed in quadrants of the faceplate 301 of second subassembly 300 and thus cause the gripper-assemblies 224 to be approximately distributed around the tire 106 of wheel 102 (not shown). As shown in FIG. 4E, in some embodiments, as the gripper-assemblies 224 make their way around the tire 106 of wheel 102, the cleat 202a may pivot at pin 406 relative to strut 204a (with rotation 408) so that contact between the ground 410 and the cleat 202a does not cause the cleat 202a to break.

Retraction of the Retractable Traction System

The retraction of the exemplary retractable traction system 104 mirrors much of the deployment process described above. In this embodiment, the retraction of the retractable traction system 104 can take place while the wheel 102 is in use (for example, switching to driving on plowed roads). In the retraction process, once the gripper-assemblies 224 are deployed, as shown in FIG. 4E, stopper 226a may be moved back into a stopping position to enable the collection of gripper-assemblies 224 into their "parked" mode. Specifically, stopper 226a engages the forward peg 222b of the inner slider 208d such that the spring 402 is compressed and peg 222b moves in direction 412 (opposite to direction 401). This causes the inner pusher 304d to disengage from peg 222b and move past gripper-assembly 224d. The stopping of a first gripper-assembly 224 causes the remaining gripper-assemblies 224 to be stopped. The position of the pegs 222b of each gripper-assembly 224 are similarly adjusted as each gripper-assembly 224 comes into contact with its neighboring gripper-assembly 224. This process can continue until all of the gripper-assemblies 224 are removed from around the tire 106 of wheel 102. In some embodiments, the outer pusher 302 rotates until it makes contact with the peg 222a and pushes it to group with other gripper-assemblies 224.

In yet another embodiment, portion 228a of stopper 226a engages the forward peg 222a on the outer slider 208d such that spring 402 is compressed and peg 222a moves in direction 412. This causes the outer pusher 302 to push the gripper-assemblies 224 into a vertical position (similar to that shown in FIG. 4A). As gripper-assemblies 224 come to a vertical parked position, outer pusher 302 continues to move past each now-vertical gripper assembly 224 and, finally, move past the gripper assembly 224d to attain the parked position of gripper-assemblies 224. In some embodiments, the outer pusher 302 may require at least one rotation of the wheel to push the gripper-assemblies 224 into the vertical parked position. Because the retractable traction system 104 can be retracted or deactivated at any time, the outer pusher may be in various positions relative to the gripper-assemblies 224 for any given deactivation instance. Thus, for example, if the outer pusher 302 is positioned behind the last gripper-assembly 224 to be parked, then only one rotation is necessary. Specifically, if the outer pusher 302 is between gripper-assemblies 224b and 224c (as shown in FIG. 4D) and stopper 226a stops gripper-assembly 224c, then the outer pusher 302 can push gripper-assembly 224b and effectively group all gripper-assemblies 224a, 224b, 224c, and 224d within one rotation of the wheel 102. However, in another example, if the outer pusher 302 is between gripper-assemblies 224a and 224b (as shown in FIG. 4D) and stopper 226a stops gripper-assembly 224c, outer pusher 302 can group gripper-assemblies 224a, 224d, and 224c within a first rotation of the wheel 102 and follow up to group gripper-assembly 224b in the second rotation of the wheel 102. It can be understood by one skilled in the art that the process described herein is applicable to the other possible positions of the outer pusher 302 for grouping gripper-assemblies 224 into their vertical parked position.

Control of Retractable Traction Systems

Figures 5A, 5B:
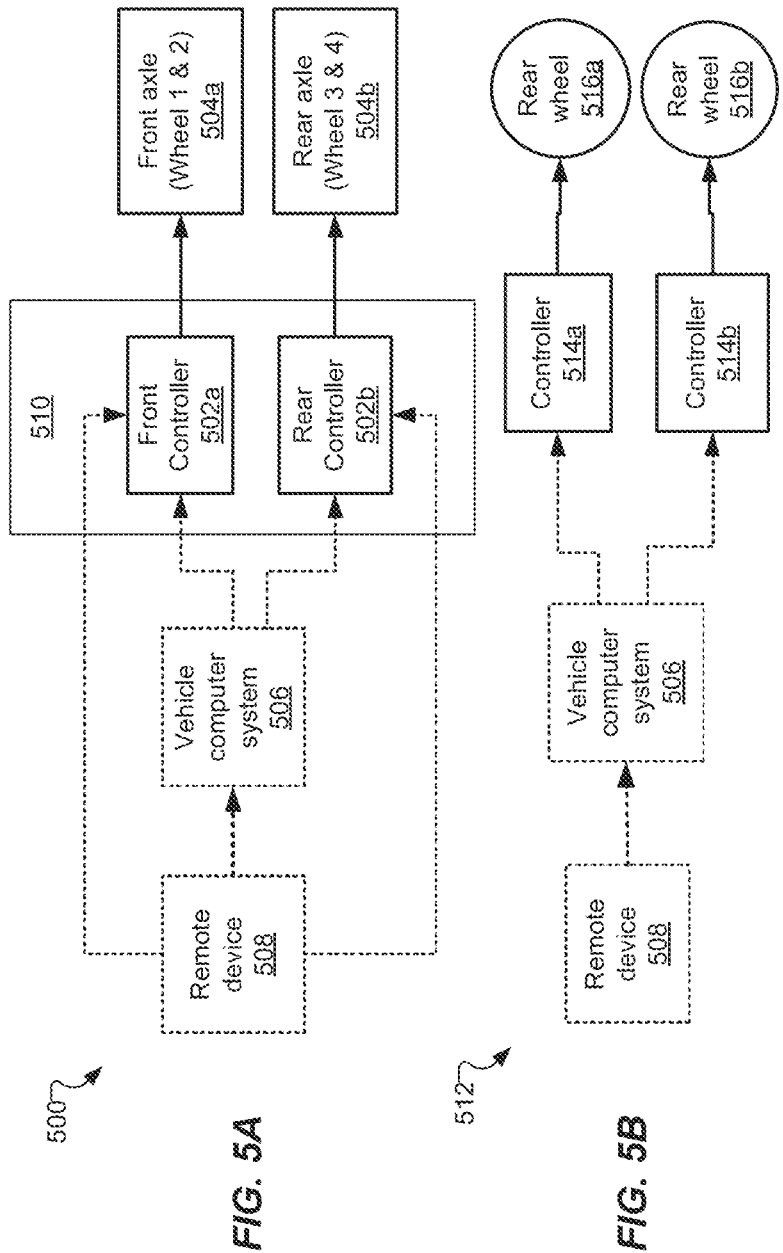
FIGS. 5A-5B are diagrams of exemplary control systems for use with one or more retractable traction systems, in accordance with another embodiment of the invention.

FIGS. 5A-5B are diagrams of exemplary control systems for use with one or more retractable traction systems 104. FIG. 5A illustrates control system 500 having a front controller 502a coupled to the retractable traction systems 104 of the front axle 504a (one retractable traction system 104 for each wheel) and a rear controller 502b coupled to the retractable traction systems 104 of the rear axle 504b (one retractable traction system 104 for each wheel) of a vehicle. In some embodiments, the control signal originates from the vehicle computer system 506, which may have an automatic setting or a manual setting. In the automatic setting, the vehicle may have a sensor configured to detect a particular environmental condition, such as snow, ice, or mud, and automatically send a control signal to each controller to deploy the retractable traction systems 104 of each wheel 102. In another example, a user may provide input to the vehicle computer system 506 (via a user interface) to activate the retractable traction systems 104. In some embodiments, a remote device 508 can provide a control signal to either the vehicle computer system 506 or directly to the controllers 502a, 502b to deploy the respective retractable traction systems 104 based on detected surface conditions ahead. For example, remote device 508 can include, e.g., a remote control device (such as a remote starter for a vehicle), any network-enabled device (such as a smartphone, tablet, or laptop computer), another vehicle ahead that detects the surface conditions, and/or a satellite capable of sending detected surface conditions. For example, the remote device 508 can have an app to control the activation/deactivation of the retractable traction system 104. If, for example, the retractable traction systems 104 are installed on a robot or autonomous vehicle, the remote device 508 can be the controller of the robot or autonomous vehicle. Note that in some embodiments, a vehicle may only have retractable traction systems 104 on a front or a rear axle 504a, 504b, instead of both. In such a case, only a single controller 510 may be used. In yet another example, a single controller 510 can be coupled to and control all retractable traction systems 104 on a vehicle. In some embodiments, the control of the stoppers and/or the retractable traction system 104 can be controlled by a cable coupled directly or indirectly to the stopper(s), such that the cable causes movement of the stopper. For example, user can activate the retractable traction system 104 by pulling on such a cable from within the vehicle or exterior to the vehicle to activate or deactivate the retractable traction system 104.

FIG. 5B illustrates a control system 512 in which each retractable traction system 104 has its own controller. This is in contrast to the previous example, where a single controller 510 could be coupled to two or more retractable traction systems 104. Thus, controller 514a controls one retractable traction system 104, e.g., for one rear wheel 516a and controller 514b controls another retractable traction system 104, e.g., for the other rear wheel 516b. In some embodiments, controllers 514a and 514b can work together to synchronize their processes, such as the deployment and/or retraction of the retractable traction systems 104.

Figure 6A:
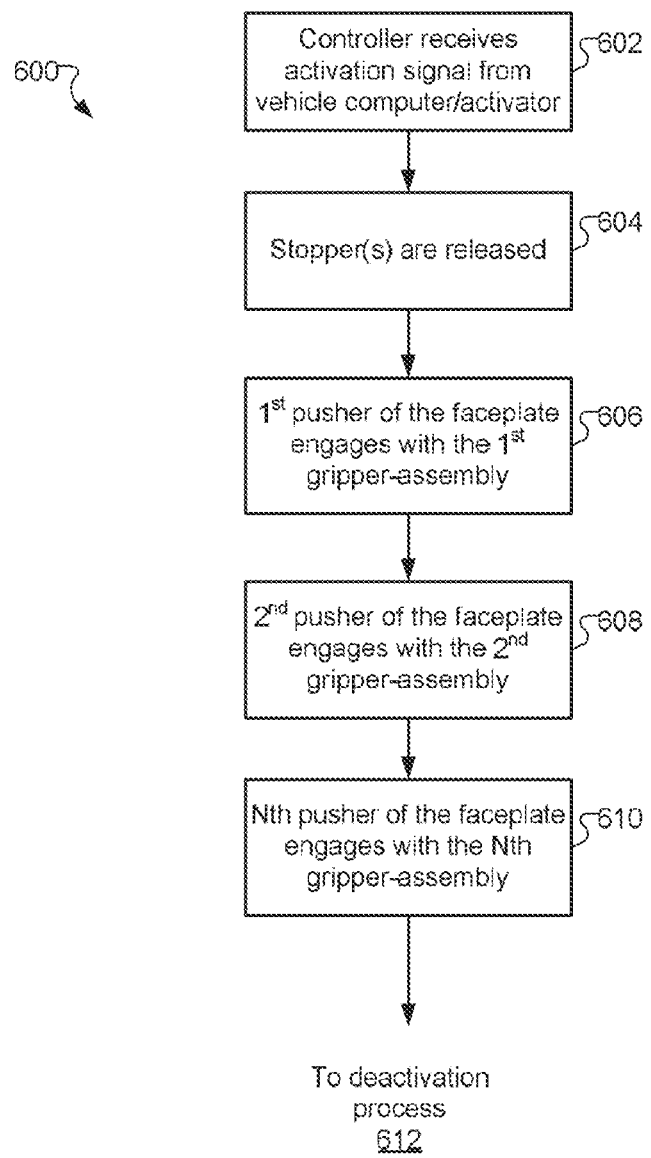
FIG. 6A is a flowchart of an exemplary activation process of the retractable traction system, in accordance with another embodiment of the invention.

FIG. 6A is a flowchart of an exemplary activation process 600 of the retractable traction system 104 described herein. In process 602, a controller 510 or 514a, 514b of the retractable traction system 104 receives an activation signal from, for example, the vehicle computer system 506. In process 604, the first and second stoppers 226 are released or moved away from the gripper-assemblies 224. In process 606, the first inner pusher 304a of the faceplate 301 of the second subassembly 300 engages with the first gripper-assembly 224, causing a slider of the first gripper-assembly 224a to move in its raceway. In process 608, the second pusher 304b of the faceplate 301 of the second subassembly 300 engages with the second gripper-assembly 224b, causing a slider of the second gripper-assembly 224b to move in its raceway. This process occurs until the Nth slider is engaged and pushed to its position in the raceway (process 610).

Figure 6B:
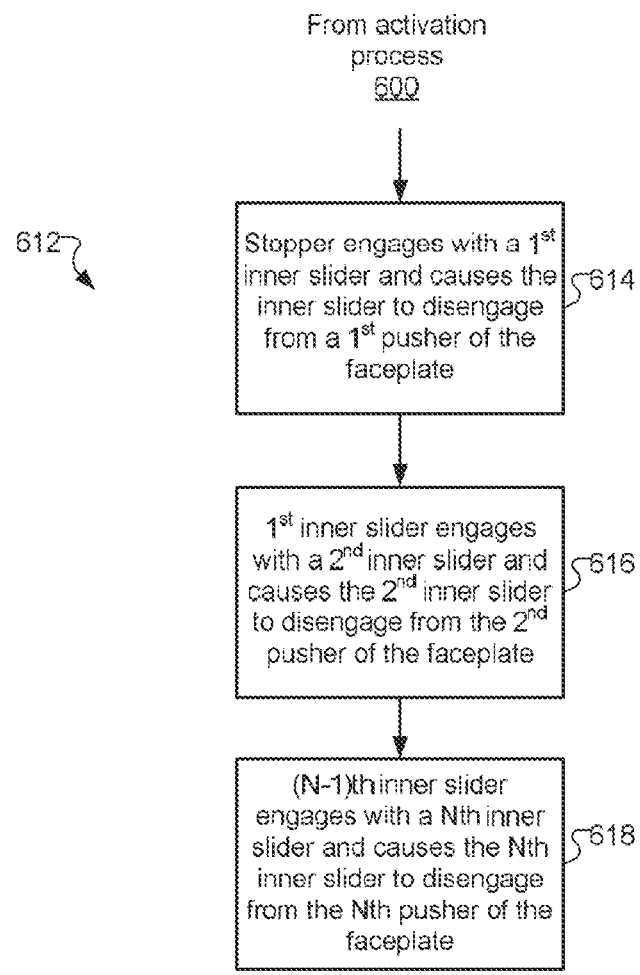
FIG. 6B is a flowchart of an exemplary deactivation process of the retractable traction system, in accordance with another embodiment of the invention.

FIG. 6B is a flowchart of an exemplary deactivation process 612 of the retractable traction system 104 described herein. In process 614, the stopper 226a engages with a first slider and causes the slider to disengage from the first pusher 304a of the faceplate 301. In process 616, the first slider engages with the second slider and causes the second slider to disengage from the second pusher 304b of the faceplate 301. In process 618, the (N−1)th slider engages with the Nth slider and causes the Nth slider to disengage from the Nth pusher of the faceplate. This process continues until each of the gripper-assemblies 224 is decoupled from the wheel 102.

Other Embodiments

Other mechanisms may be used in place of the peg-pusher mechanism ("catch" system) described above. For example, in FIGS. 4A-4E, peg 222b is moved between at least two positions to catch or avoid catching inner pusher 304a. In another embodiment, one or more electromechanical solenoids can be incorporated into the first subassembly 200 to achieve the purpose of catching pushers of the second subassembly 300. In yet another embodiment, torsion springs, or other types of springs, can be used in place of, or in addition to, the electromechanical solenoids to cause the catching of the pushers of the second subassembly 300.

Figure 7A:
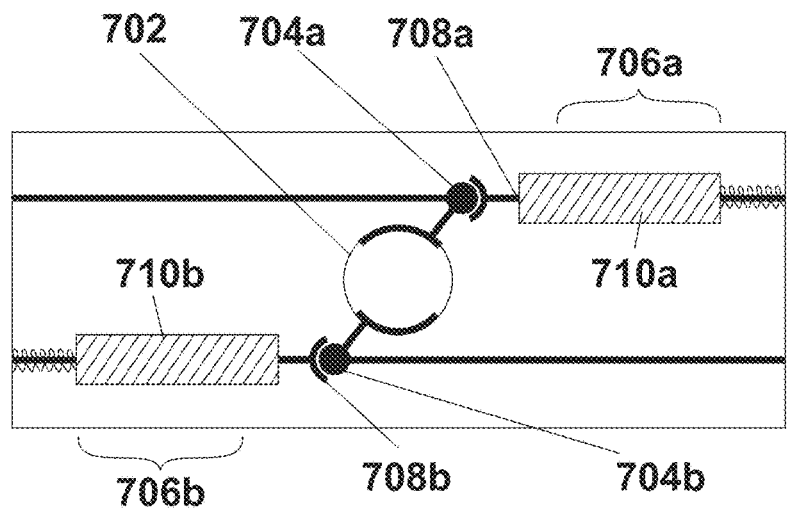
FIGS. 7A-7C are diagrams illustrating an exemplary solenoid mechanism that can be applied to a catch system of an exemplary retractable traction system, in accordance with another embodiment of the invention.
Figure 7B:
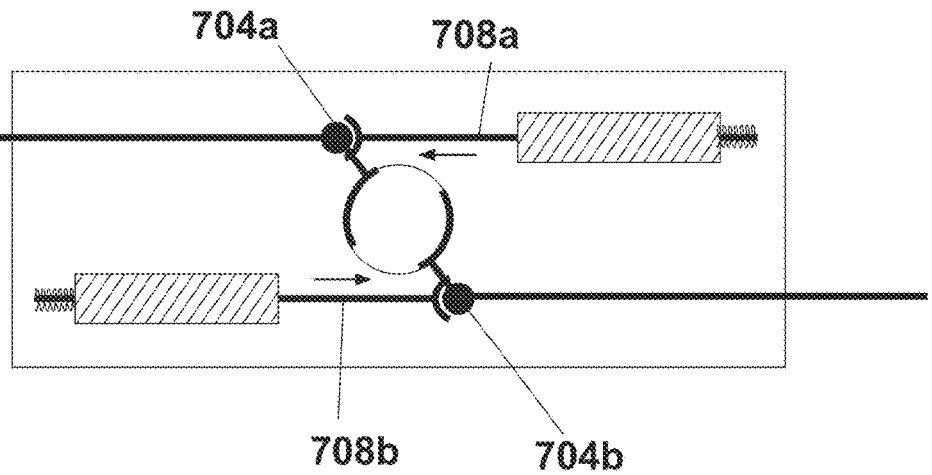
Figure 7C:
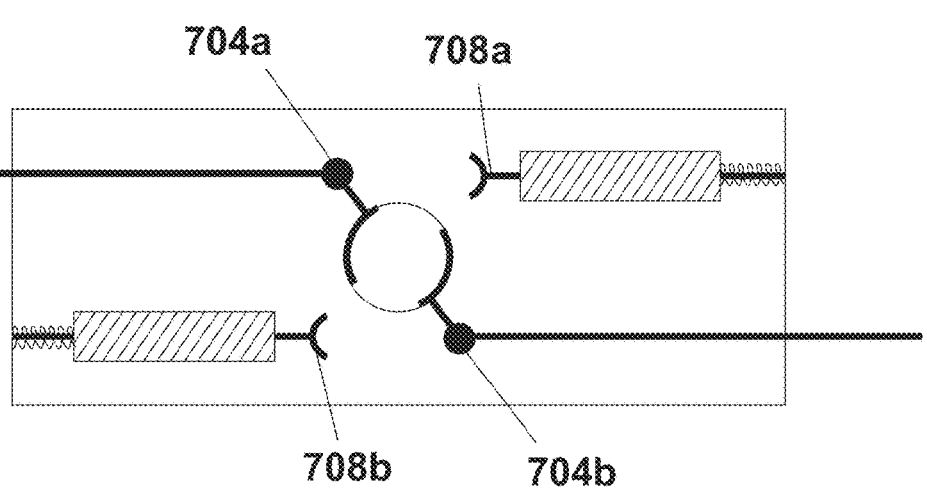

FIGS. 7A-7C illustrate an exemplary solenoid mechanism that can be applied to the catch system of the retractable traction system 104. FIG. 7A shows pivot 702 coupled to first and second ball-shaped subjects 704a, 704b (collectively referred to as 704). In this system, a first electromechanical solenoid 706a has a plunger 708a aimed at the first subject 704a opposite a second electromechanical solenoid 706b has a plunger 708b aimed at the second subject 704b (solenoids 706a, 706b are collectively referred as 706 and plungers 708a, 708b are collectively referred to as 708).

FIG. 7B illustrates an activated state for the exemplary electromechanical solenoids 706. When the electromechanical solenoid 706 is actuated by an electrical current, plunger 708 is caused to extend from the solenoid body 710a, 710b (collectively referred to as 710). For example, one or more controllers 502a, 502b, 510, 514a, 514b can send a signal to activate the solenoid. This action causes the subjects 704 to move in opposing directions about the pivot 702. In FIG. 7C, when the plungers 708 retract into the body 710, the subjects 704 remain in the position to which they were pushed.

Figure 8A:
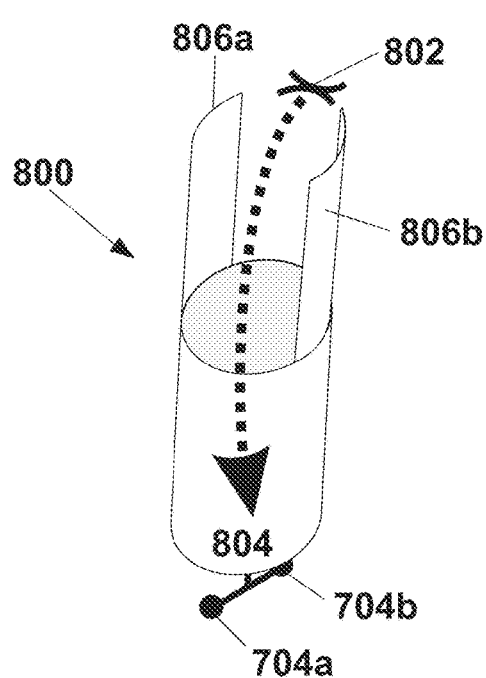
FIG. 8A is a diagram of an exemplary catch system for the exemplary retractable traction system, in accordance with another embodiment of the invention.

FIG. 8A is a diagram of an exemplary catch system for the retractable traction system 104. The catch system 800 includes a pusher 802 and a pivoting cup 804. The pivoting cup 804 is coupled to a two arms with subjects 704a, 704b, used to pivot the cup according to the mechanism described above for FIGS. 7A-7C and further described below for FIGS. 9A-9B. The pivoting cup 804 has two cup walls 806a, 806b (collectively referred to as 806). In some embodiments, the cup has one or more cup walls 806. The configuration of the cup walls 806a, 806b allows the pusher 802 to pass through the pivoting cup 804 when the retractable traction system 104 is deactivated. This is analogous to when the peg 222b is positioned away from the path of the pusher 304a, as illustrated in FIGS. 4A-4E. Note that the pusher 802 is coupled to the faceplate 301 of the second subassembly 300. For example, pusher 802 can be positioned in a similar position to that of inner pusher 304a.

Figure 8B:
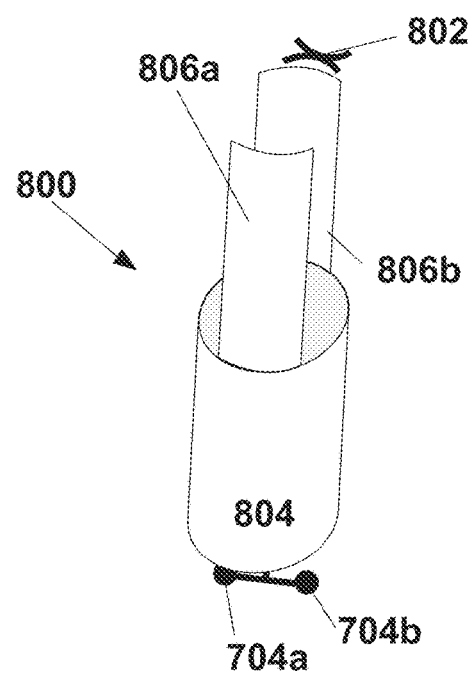
FIG. 8B is a diagram of the exemplary catch system when the retractable traction system is activated, in accordance with another embodiment of the invention.
Figure 8C:
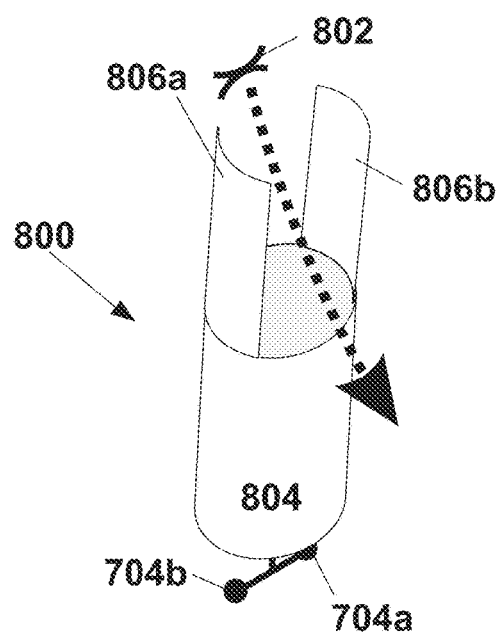
FIG. 8C is a diagram of the exemplary catch system when the retractable traction system is deactivated, in accordance with another embodiment of the invention.

FIG. 8B is a diagram of the exemplary catch system 800 when the retractable traction system 104 is activated. At this time, the pivoting cup 804 has been pivoted by opposing electromechanical solenoids 706. By pivoting, the cup walls 806a, 806b have changed position such that at least one cup wall 806b blocks the path of the pusher 802. In some embodiments, the pusher has a "butterfly" shape so as to embrace the outside of the cup wall 806b during the pushing operation. FIG. 8C is a diagram of the exemplary catch system 800 when the retractable traction system 104 is deactivated. FIG. 8C illustrates how the pivoting cup 804 is adjusted to allow the pusher 802 get by the blocking cup wall 806a.

Figure 9A:
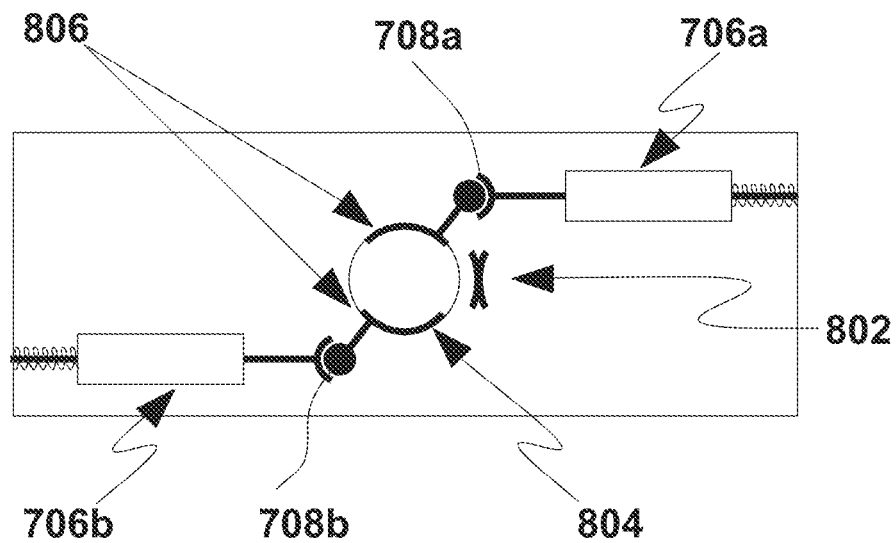
FIGS. 9A-9B is a diagram combining the exemplary catch system of FIGS. 8A-8C with the solenoid mechanism illustrated in FIGS. 7A-7C, in accordance with another embodiment of the invention.
Figure 9B:
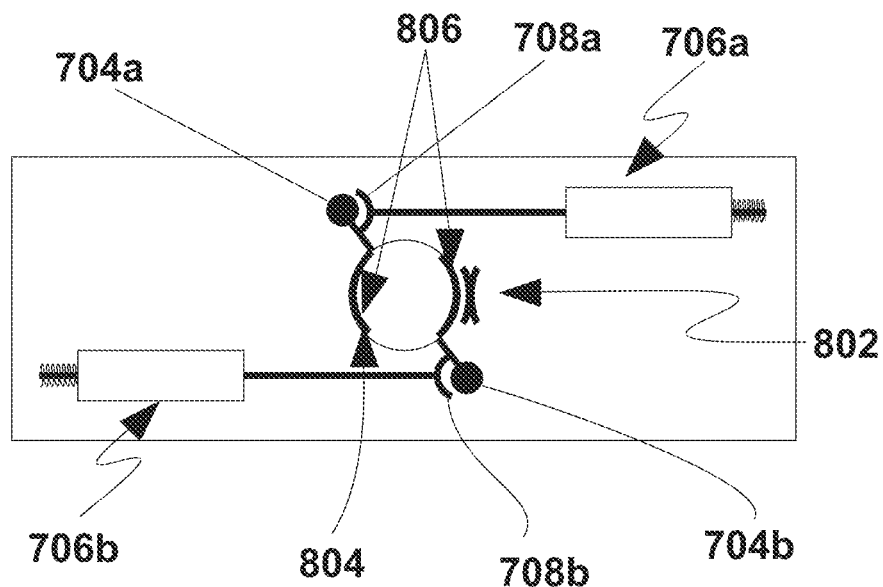

FIGS. 9A-9B is a diagram combining the exemplary catch system 800 of FIGS. 8A-8C with the solenoid mechanism illustrated in FIGS. 7A-7C. In FIG. 9A, the pivoting cup 804 is configured, in the deactivated state of the retractable traction system 104, to allow the pusher 802 to pass between the two cup walls 806. In FIG. 9B, the pivoting cup 804 is pivoted by activated solenoids 706a and 706b (for example, via a controller signal) to push subjects 708a and 708b, respectively, thereby blocking the path of the pusher 802. As the pusher 802 travels via the turning of the faceplate 301, it makes contact with a cup wall 806 and pushes the cup 804.

Figure 10:
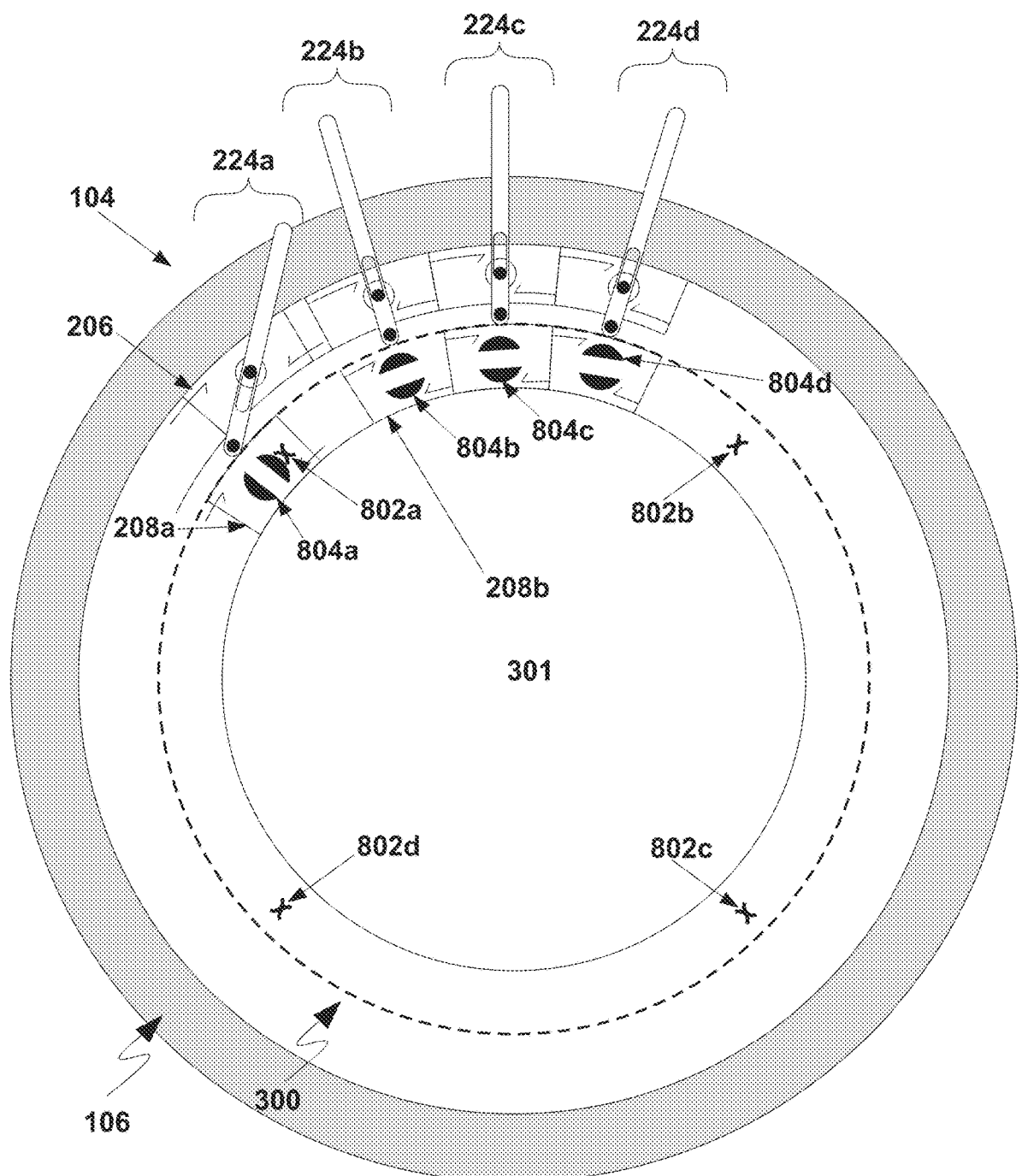
FIG. 10 is a diagram of the catch system illustrated in FIGS. 9A-9B incorporated into the exemplary retractable traction system, in accordance with another embodiment of the invention.

FIG. 10 is a diagram of the catch system illustrated in FIGS. 9A-9B incorporated into the retractable traction system 104. As provided in FIGS. 4A-4E, the retractable traction system 104 includes at least three gripper-assemblies 224. In this illustration, each of the inner sliders 208 and outer slider 206 have a catch system 800 that is used to engage with the pushers 802a-802d (collectively referred to as 802) when the retractable traction system 104 is activated. The exemplary configuration provided in FIG. 10 otherwise operates similarly to that provided in FIGS. 4A-4E.

Although the above describes using one or more solenoids, other electromechanical systems may also be used. For example, electromechanical systems may include servomotors and/or stepper motors that may directly pivot cup 804 to engage and disengage pusher 802.

Exemplary Electronic Traction System

In an exemplary embodiment, one or more of sliders 206, 208 include electromagnets located in or behind each slider, wherein each electromagnet can be activated by an activation or control signal from a controller coupled to the retractable traction system 104 (as discussed in more detail above). The electromagnets can be activated to hold the sliders in place by being magnetically attracted to a metallic component, such as the walls of raceways 210, 212 (shown in FIG. 2A) or a metallic plate 109 (shown in FIG. 1B).

During the activation of the retractable traction system 104, the stopper 228a moves away from the path of the sliders 206, 208. At this time, the electromagnets are energized, holding the sliders 206, 208 in place. A controller can send a control signal to de-energize the electromagnet of a first inner slider 208a. Once the first inner slider 208a is free to move along the raceway 212, the remaining sliders can move by any of the mechanisms described in FIGS. 1-6 or FIGS. 7-10.

Figure 11:
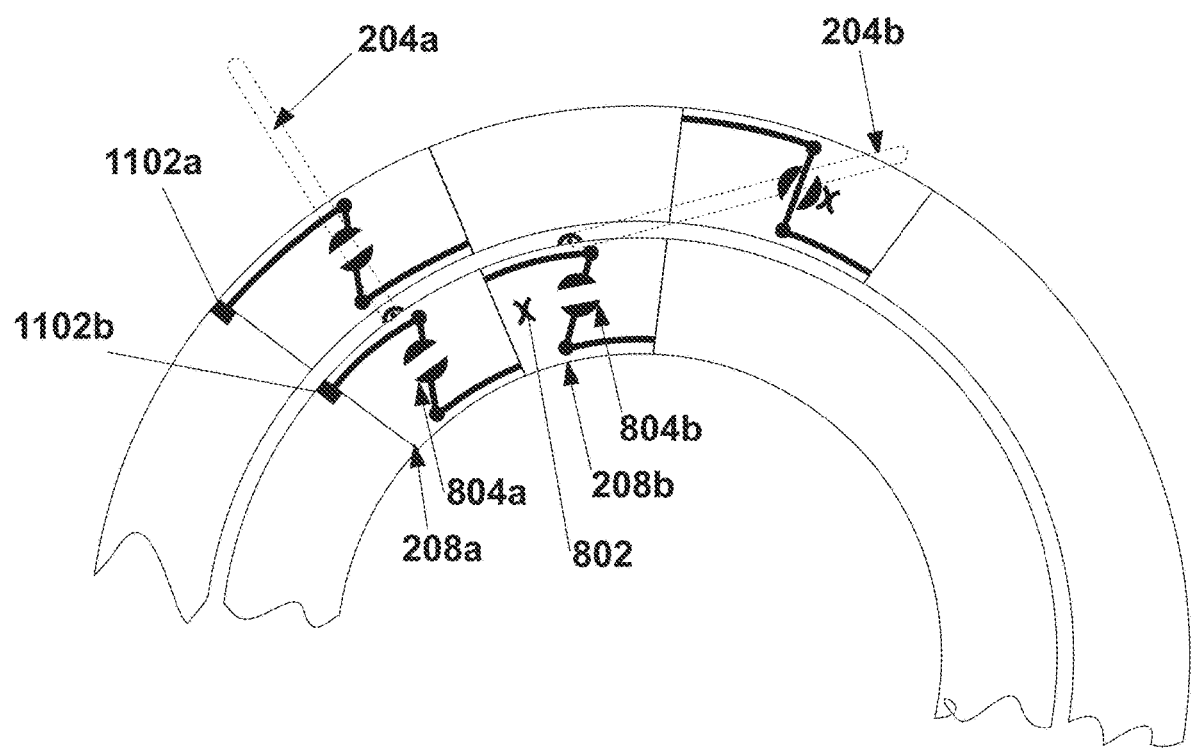
FIG. 11 is a partial view of an exemplary retractable traction system using torsion springs in accordance with another embodiment of the invention.

FIG. 11 is a partial view of an exemplary retractable traction system 104. In this embodiment, torsion springs are used in place of the electromechanical solenoids 706a, 706b to cause the catching of the pushers of the second subassembly 300. Thus, when the first inner slider 208a is freed to move along raceway 212, a torsion spring releases and pushes away from a neighboring slider 208b. Cup 804a pivots to engage pusher 802a. Once the first inner slider 208a is moved, the electromagnet of the next slider 208b is de-energized. This causes the respective torsion spring of slider 208b to release. This sequence is repeated for the remaining sliders.

In this embodiment, there are two stoppers 1102a and 1102b configured to stop inner sliders 208 and outer sliders 206, respectively. When stopper 1102b is activated, the arm of 704a pushes against 1102b. Once the cup 804a turns, pusher 802 can pass through freely. Next, once the electromagnet of slider 208b is turned on, slider 208b stays in place. This is repeated until all of the sliders come into a parked position. In some embodiments, when all of the gripper-assemblies 224 are grouped and in their parked position (for instance, in the vertical position), the electromagnets in the one or more sliders 206, 208 of the gripper-assemblies 224 can be de-energized.

Figure 14A:
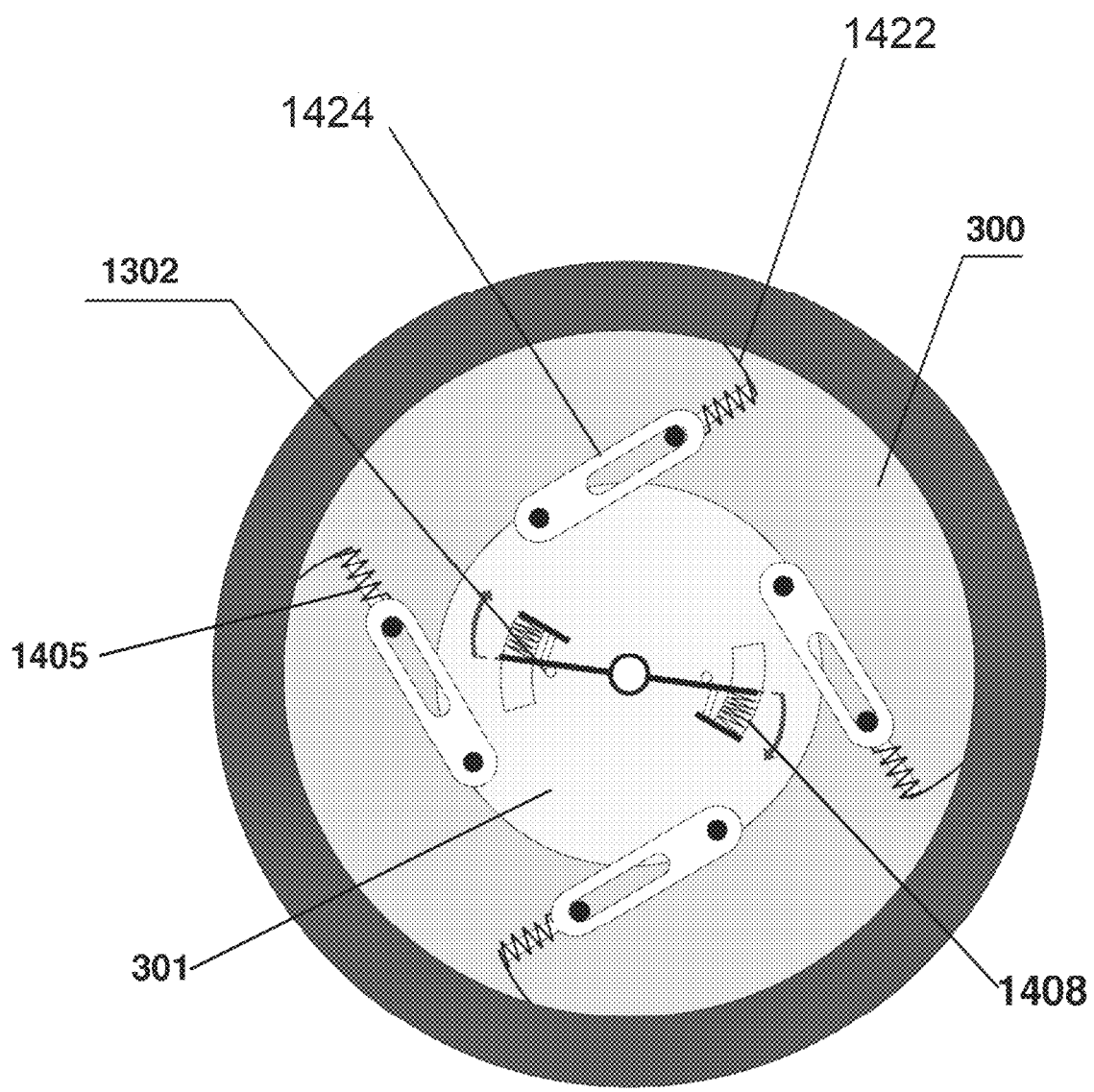
FIGS. 14A and 14B are a front view and side view, respectively, of another retractable traction system mounted on a wheel in a parked or disengaged position.
Figure 14B:
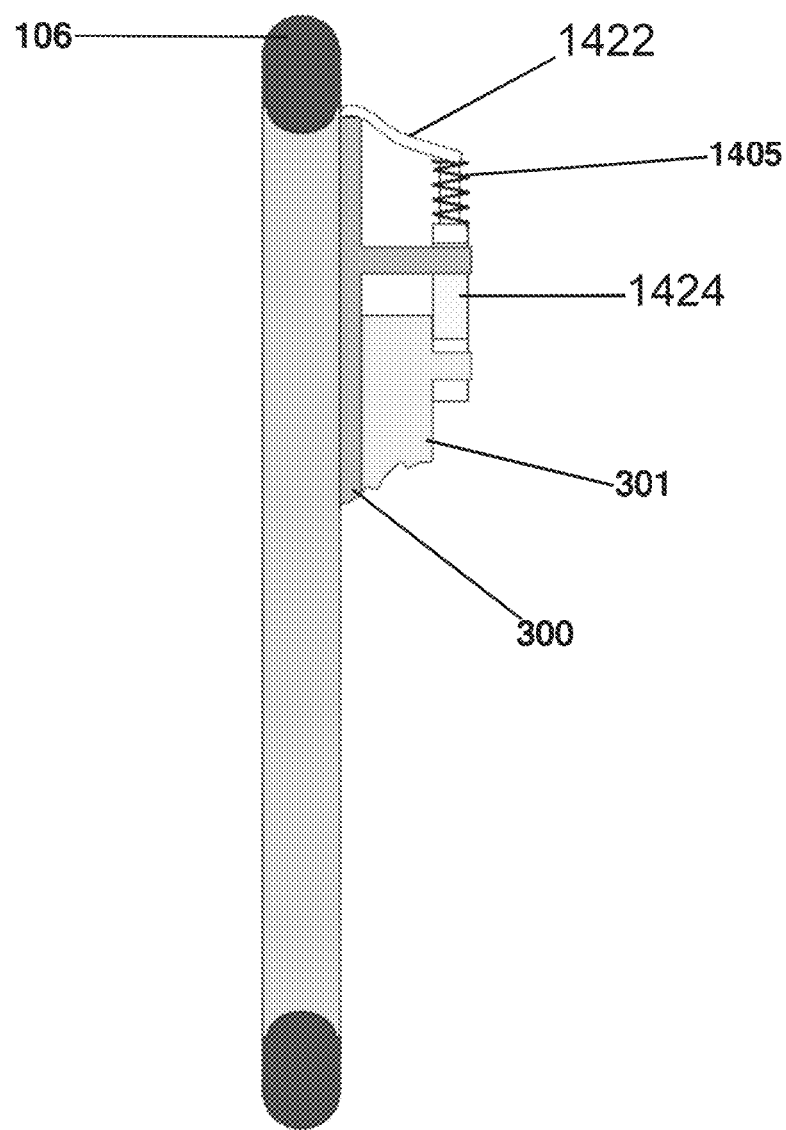
Figure 14C:
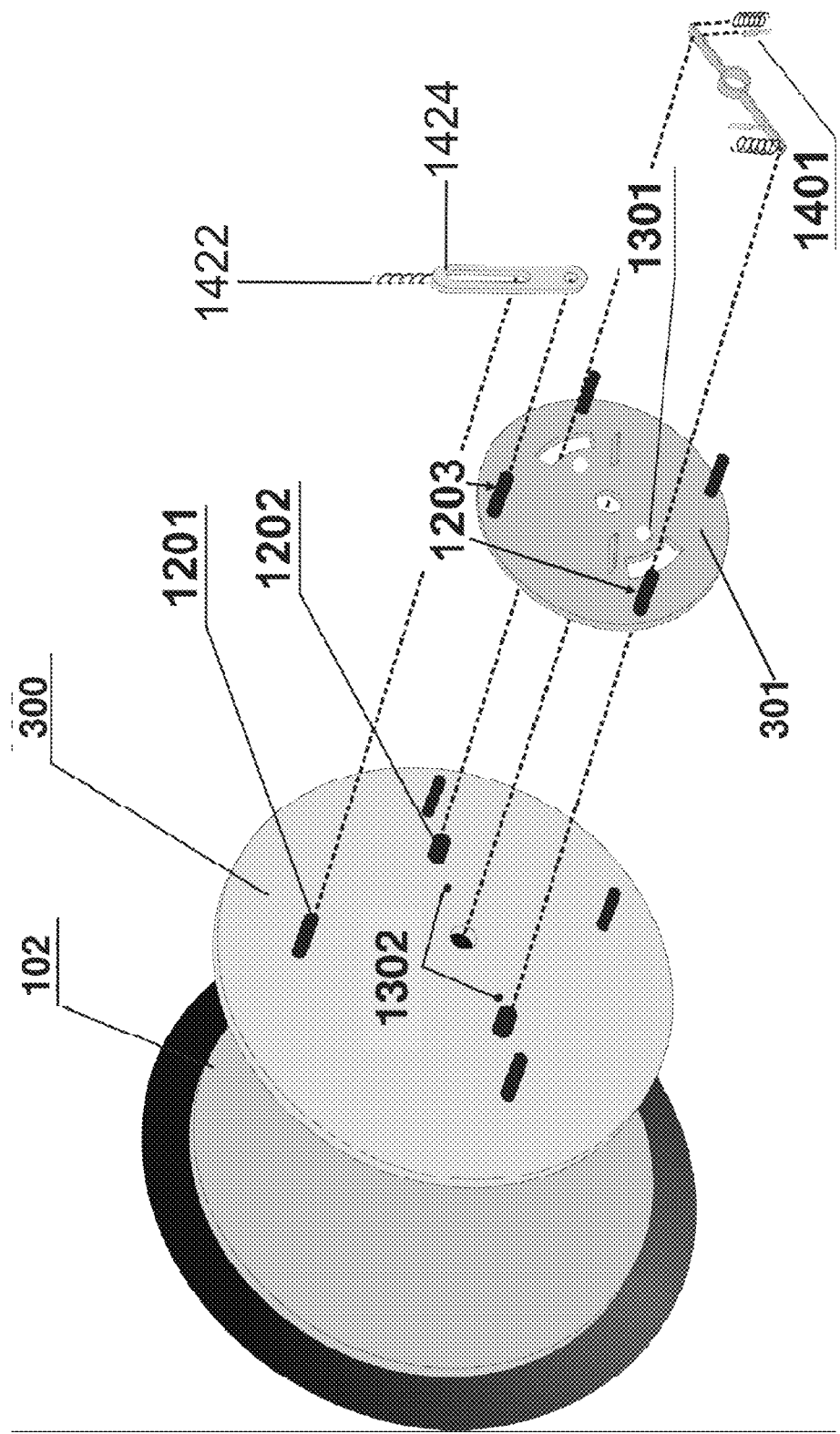
FIG. 14C is an exploded perspective view of the retractable traction system shown in FIGS. 14A-14B in accordance with another embodiment of the invention.
Figure 15A:
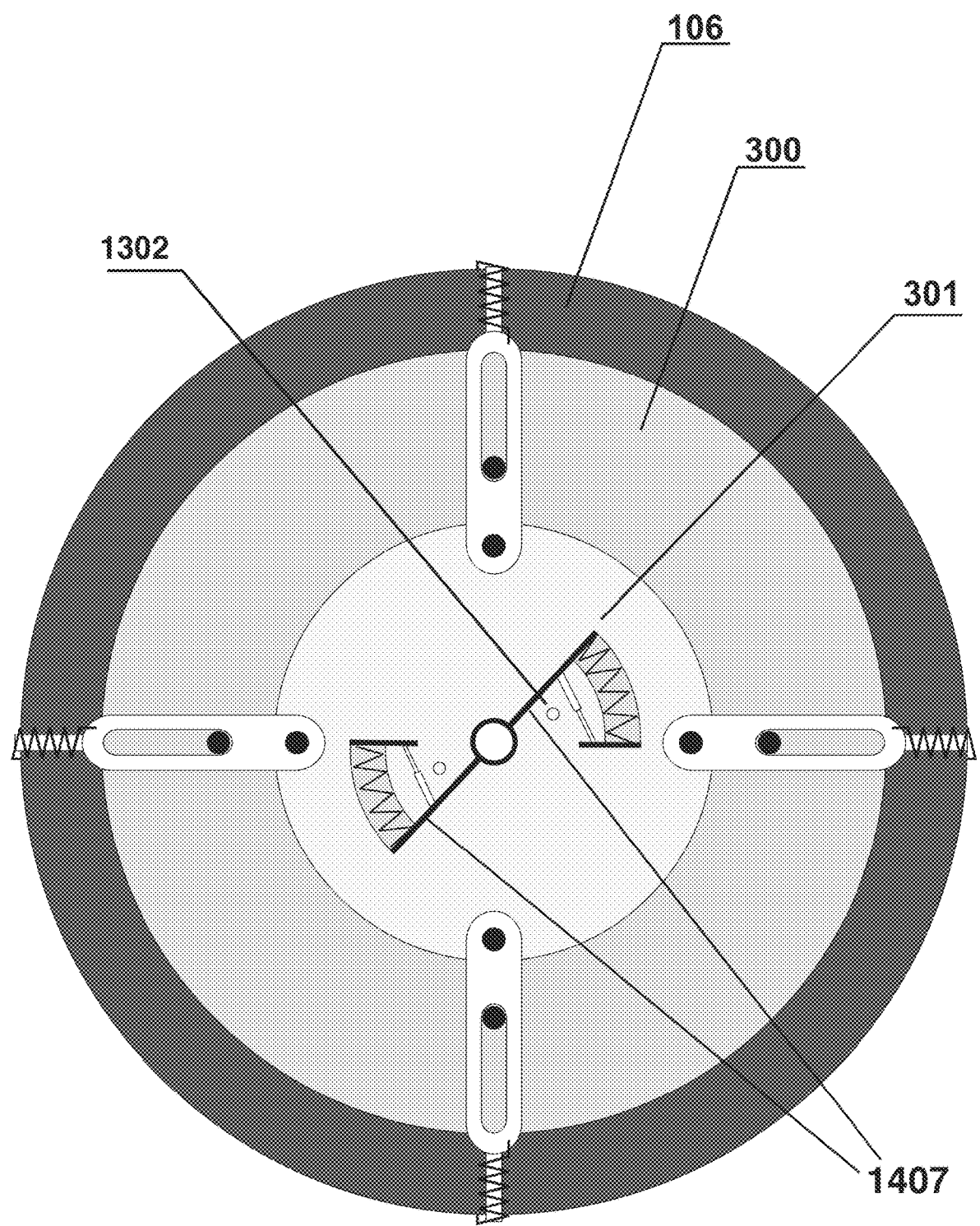
FIG. 15A is a front view.
Figure 15B:
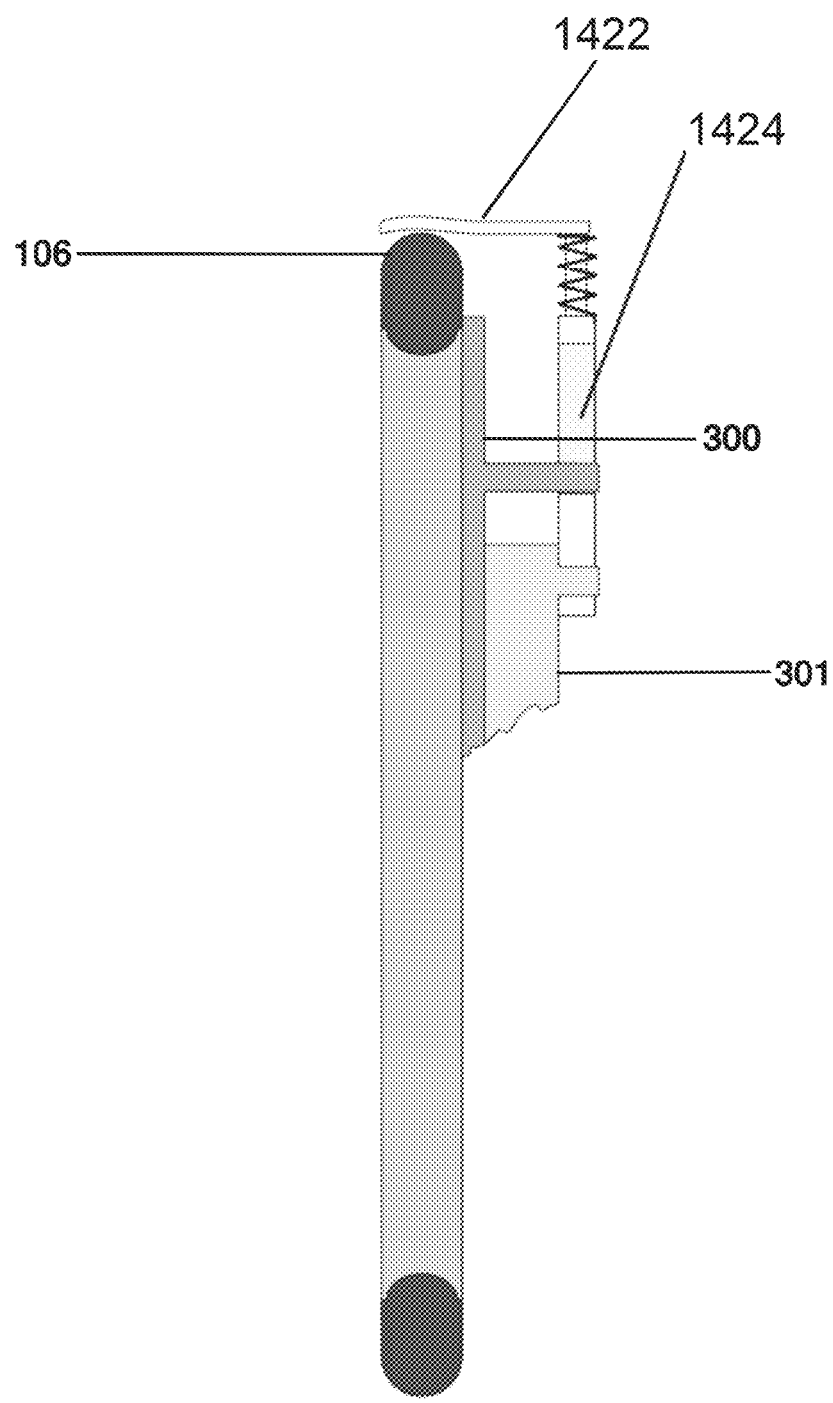
FIG. 15B is a side view.
Figure 15C:
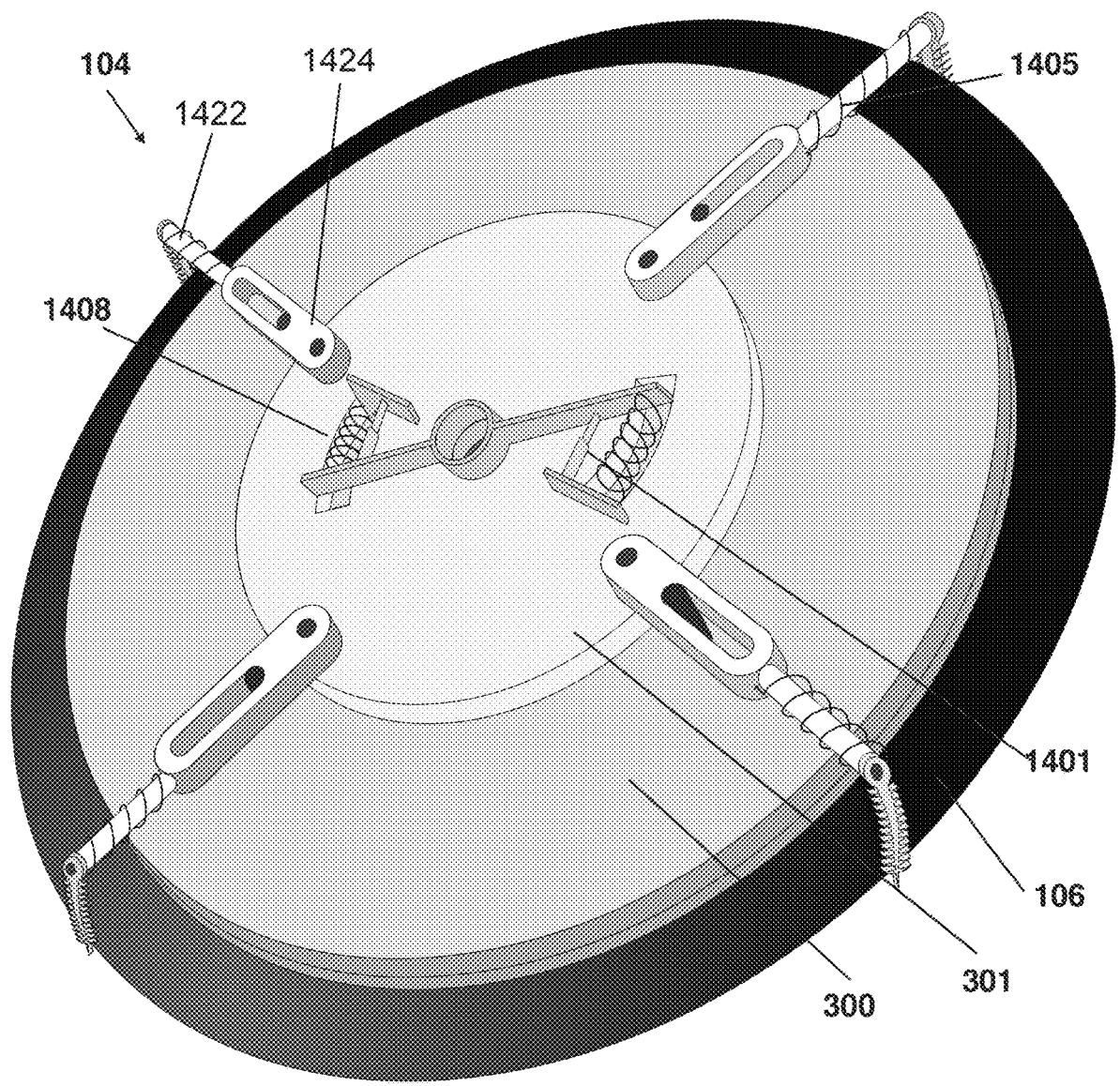
FIG. 15C is a perspective front view of the retractable traction system shown in FIGS. 14A-14B in an engaged position in accordance with an embodiment of the invention.

FIGS. 14A-14C and 15A-15C show another exemplary retractable traction system 104. In this embodiment, the retractable traction system 104 includes two faceplates or discs 300, 301. Faceplate 300 is adjacent to the wheel 102 and has a larger diameter then the faceplate 301 further from the wheel 102. As shown in more detail in FIG. 14C, both faceplates 300, 301 are engaged with each other via poles 1202 starting at the larger faceplate 300 and extending into the path of the smaller faceplate 301. In yet another embodiment, both faceplates 300, 301 may contain poles 1201 and 1203. The combination of the poles 1202 and the faceplates 300, 301 or poles 1201, 1203 and the faceplates 300, 301 are configured to hold in place strut 1424. Strut 1424 is located on the smaller faceplate 301. As shown in FIGS. 14A and 14B, cleat 1422 may be pushed against the larger faceplate 300 in a disengaged position. The retractable traction system 104 is activated when stoppers 1302 (shown in FIGS. 14A and 14C) are extracted from the smaller faceplate 301 via the stopper holes 1301 on the smaller faceplate 301 and activate springs 1408 that rotate the smaller faceplate 301 in relation to the larger faceplate 300 which may be attached to the wheel 102. As the retractable traction system 104 moves from the disengaged position to the engaged position, the rotating top part of a cleat 1422 is moved above the surface of the tire 106. Torsion springs 1405 continue to unwind until the cleat 1422 is pulled down and held on top of the tire 106 in the engaged position, as shown in FIGS. 15A and 15B. As shown in FIG. 15C, the retractable traction system 104 is deactivated when mechatronics cylinder 1401 pulls down shelf 1407 attached to the top of the spring 1408 and allows stopper 1302 to be retrieved into the stopper hole 1301 on smaller faceplate 301. At this time, torsions spring 1405 winds down the cleat 1422 to the side of the tire 106 and causes the cleat 1422 to move to the surface of larger faceplate 300, as shown in FIGS. 14A and 14B in the disengaged position. The retractable traction system 104 may be already integrated, as part of the wheel 102 and turn with the wheel 102 or the retractable traction system 104 may be attachable to the existing wheel 102.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for retractably deploying enhanced traction of a wheel, the wheel having a tread and an axis of rotation, the system comprising:
    a set of grippers, each gripper having a cleat and a radially disposed strut;
    a set of first poles, each first pole coupled to one of the struts, each of the first poles configured to support motion of its corresponding strut between a parked position and an engaged position,
        wherein, in the engaged position of such strut, the corresponding cleat is axially disposed and engaged against the tread of the wheel and, in the parked position of such strut, the corresponding cleat is disengaged from the tread of the wheel;
    a first faceplate configured to rotate with the wheel, wherein, when such strut is in the engaged position, such strut is coupled to the first faceplate and moves with the first faceplate and the wheel, and, when such strut is in the parked position, the strut causes the cleat to be in a corresponding disengaged position, withdrawn in a radial direction from the tread; and
    a cleat deployment mechanism including:
        a second face plate rotatably coupled to the first faceplate and configured for rotation between first and second positions, and
        a set of second poles, each second pole coupled to a respective one of the struts and to the second faceplate, and configured so that rotation of the second faceplate between the first and second positions causes corresponding motion of each strut between the parked and engaged positions respectively.

2. A system according to claim 1, wherein the cleat is configured to rotate axially relative to the strut and is coupled to a torsion spring to bias the cleat in the disengaged position.

3. A system according to claim 1, wherein the second faceplate is reversibly latched in the first position by a set of stoppers.

4. A system according to claim 3, further comprising a set of springs, coupled to the second faceplate, the set of springs being configured to bias the second faceplate against the set of stoppers when the stoppers are deployed, and to rotate the second faceplate to the second position when the stoppers are retracted.

5. A system according to claim 4, further comprising a set of actuators, coupled to the second faceplate, the set of actuators being configured, when activated, to rotate the second faceplate from the second position to the first position and in so doing to compress the set of springs coupled to the second faceplate.

* * * * *